US008305927B2

(12) United States Patent
Ishii

(10) Patent No.: US 8,305,927 B2
(45) Date of Patent: Nov. 6, 2012

(54) WIRELESS NETWORK CONSTRUCTION SYSTEM

(75) Inventor: Yosuke Ishii, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 238 days.

(21) Appl. No.: 12/009,171

(22) Filed: Jan. 17, 2008

(65) Prior Publication Data

US 2009/0116407 A1  May 7, 2009

(30) Foreign Application Priority Data

Jan. 23, 2007  (JP) ................................ 2007-012247
Jun. 1, 2007  (JP) ................................ 2007-146572

(51) Int. Cl.
*H04B 17/00* (2006.01)
*H04L 12/28* (2006.01)
(52) U.S. Cl. .................. 370/254; 455/67.11; 455/67.13
(58) Field of Classification Search .................. 370/254; 455/67.11, 67.13
See application file for complete search history.

(56) References Cited

U.S. PATENT DOCUMENTS

| 2004/0071148 | A1* | 4/2004 | Ozaki et al. ................... 370/401 |
| 2005/0108427 | A1* | 5/2005 | Datta ........................... 709/238 |
| 2006/0221858 | A1* | 10/2006 | Switzer et al. ................ 370/254 |
| 2006/0259542 | A1* | 11/2006 | Wu et al. ........................ 709/202 |
| 2007/0002833 | A1* | 1/2007 | Bajic ............................. 370/352 |
| 2007/0019554 | A1* | 1/2007 | Schollmeier et al. ......... 370/238 |
| 2007/0038743 | A1* | 2/2007 | Hellhake et al. .............. 709/224 |
| 2007/0066297 | A1* | 3/2007 | Heidari-Bateni ............. 455/423 |
| 2007/0076681 | A1* | 4/2007 | Hong et al. ................... 370/349 |
| 2007/0076889 | A1* | 4/2007 | DeRobertis et al. .......... 380/279 |
| 2007/0086394 | A1* | 4/2007 | Yamada et al. ............... 370/338 |
| 2007/0155423 | A1* | 7/2007 | Carmody et al. .......... 455/556.1 |
| 2007/0232288 | A1* | 10/2007 | McFarland et al. ........... 455/423 |
| 2007/0253369 | A1* | 11/2007 | Abhishek et al. ............. 370/331 |
| 2007/0270121 | A1* | 11/2007 | Shao et al. .................... 455/403 |
| 2008/0031233 | A1* | 2/2008 | Ito et al. ........................ 370/355 |
| 2008/0113623 | A1* | 5/2008 | Gormley .................... 455/67.11 |

FOREIGN PATENT DOCUMENTS

| JP | 2002-124955 | 4/2002 |
| JP | 2004-146988 | 5/2004 |
| JP | 2004-260740 | 9/2004 |
| JP | 2006254077 A | 9/2006 |
| JP | 2006-270150 | 10/2006 |

OTHER PUBLICATIONS

Japanese Office Action dated Nov. 4, 2011 issued by the Japanese Patent Office in corresponding Japanese Application No. 2007-146572.

* cited by examiner

*Primary Examiner* — Ayaz Sheikh
*Assistant Examiner* — Tarell Hampton
(74) *Attorney, Agent, or Firm* — Sughrue Mion, PLLC

(57) ABSTRACT

A wireless network construction system includes: first wireless nodes being previously installed in a wireless network; a wireless node installation support terminal carried in a location capable of conducting wireless communication, the wireless node installation support terminal serving as a wireless node being previously installed in the wireless network; and a second wireless node being newly installed in the wireless network and adjacent to the wireless node installation support terminal. The second wireless node performs a procedure of participation in the wireless network via the wireless node installation support terminal using the wireless communication. The wireless node installation support terminal allocates and distributes a network address to the second wireless node upon performing the procedure of participation in the wireless network. The second wireless node performs a path search and establishes a wireless line between the first wireless nodes and the second wireless node.

17 Claims, 19 Drawing Sheets

WIRELESS NETWORK CONSTRUCTION SYSTEM

This application is based on and claims priority from Japanese Patent Application No. 2007-012247, filed on Jan. 23, 2007 and No. 2007-146572, filed on Jun. 1, 2007, the entire contents of which are hereby incorporated by reference.

BACKGROUND OF THE INVENTION

1. Technical Field

The present disclosure relates to a wireless network construction system, and particularly to a wireless network construction system capable of improving flexibility in an installation place of a wireless node, and a wireless node installation support terminal.

2. Related Art

The following references relate to a network construction system of an ad hoc wireless network in the—related art.
Japanese Unexamined Patent Publication 1: JP-A-2002-124955
Japanese Unexamined Patent Publication 2: JP-A-2004-146988
Japanese Unexamined Patent Publication 3: JP-T-2004-260740
Japanese Unexamined Patent Publication 4: JP-A-2006-270150

FIG. 13 is a configuration block diagram showing one example of a conventional ad hoc wireless network. In FIG. 13, numerals 1, 2, 3, 4, 5 and 6 are wireless nodes for constructing an ad hoc wireless network and performing a communication through the wireless network.

More concretely, each of the wireless nodes 1 to 6 includes: a wireless communication means for conducting a wireless communication through the constructed ad hoc wireless network; a storage means for storing a program, various parameters, etc.; and an operation control means for controlling all the wireless nodes by reading out and executing the program stored in the storage means.

However, an operation as the whole wireless node will hereinafter be described without referring to a configuration of each of the wireless nodes 1 to 6 for a brief description.

The wireless node 1 is mutually connected to the wireless node 2 using a wireless network line "CN01" (hereinafter simply called a wireless line) in FIG. 13, and is mutually connected to the wireless node 3 using a wireless line "CN02" in FIG. 13.

Also, the wireless node 2 is respectively mutually connected to the wireless node 4 and the wireless node 5 using wireless lines "CN03" and "CN04" in FIG. 13. Further, the wireless node 3 is mutually connected to the wireless node 6 using a wireless line "CN05" in FIG. 13.

A wireless network construction system of the ad hoc wireless network as shown in FIG. 13 will herein be described with FIGS. 14, 15, 16, 17, 18 and 19.

FIG. 14 is a flow diagram for explaining an operation of a newly installed wireless node, and FIG. 15 is a flow diagram for explaining an operation of a previously installed wireless node, and FIGS. 16, 17, 18 and 19 are explanatory diagrams for explaining a state of wireless network construction.

In an ad hoc wireless network (hereinafter simply called a wireless network), conventionally, the wireless network is constructed in a self-growth manner by an unspecified number of wireless nodes, so that a newly installed wireless node requires processing for participating in the existing wireless network.

In "S001" in FIG. 14, a newly installed wireless node decides whether or not to participate in the existing wireless network. In the case of deciding to participate in the existing wireless network in "S001" in FIG. 14, the newly installed wireless node performs a procedure of participation in the wireless network via a previously installed and adjacent wireless node using wireless communication in "S002" in FIG. 14.

Meanwhile, in "S101" in FIG. 15, the previously installed wireless node decides whether or not there was a request for participation in the wireless network from the newly installed wireless node, and in the case of deciding that there was the request for participation, the previously installed wireless node allocates and distributes a network address to the newly installed wireless node in "S102" in FIG. 15.

Then, as necessary, the previously installed wireless node performs distribution of a key for encryption or security authentication processing to the newly installed wireless node in "S103" in FIG. 15, and the previously installed wireless node synchronizes time of the newly installed wireless node in "S104" in FIG. 15.

For example, as shown in FIG. 16, when it is assumed that a wireless node 2 is newly installed and a wireless node 1 is previously installed, the newly installed wireless node 2 performs a procedure of participation in a wireless network via the previously installed wireless node 1 as shown by "JN11" in FIG. 16, and the previously installed wireless node 1 performs processing of time synchronization, key distribution, authentication, distribution, allocation, etc. of a network address to the newly installed wireless node 2, and the newly installed wireless node 2 establishes a wireless line as shown by "CN01" in FIG. 17.

When a wireless node 3 is newly installed in the wireless network constructed thus, the newly installed wireless node 3 performs a procedure of participation in the wireless network via the previously installed wireless node 1 as shown by "JN21" in FIG. 17, and the previously installed wireless node 1 performs processing of time synchronization, key distribution, authentication, distribution, allocation, etc. of a network address to the newly installed wireless node 3, and the newly installed wireless node 3 establishes a wireless line "CN02" in FIG. 18.

Similarly, newly installed wireless nodes 4 and 5 perform procedures of participation in the wireless network on the previously installed wireless node 2 as shown by "JN31" and "JN32" in FIG. 18, and the previously installed wireless node 2 performs processing of time synchronization, key distribution, authentication, distribution, allocation, etc. of network addresses to the newly installed wireless nodes 4 and 5, and the newly installed wireless nodes 4 and 5 respectively establish wireless lines "CN03" and "CN04" in FIG. 19.

Finally, a newly installed wireless node 6 performs a procedure of participation in the wireless network via the previously installed wireless node 3 as shown by "JN41" in FIG. 19, and the previously installed wireless node 3 performs processing of time synchronization, key distribution, authentication, distribution, allocation, etc. of a network address to the newly installed wireless node 6, and the newly installed wireless node 6 establishes a wireless line "CN05" in FIG. 13.

Thus, the newly installed wireless nodes perform the procedures of participation in the wireless network via the previously installed and adjacent wireless nodes, so that the wireless network can be constructed in a self-growth manner.

However, in the conventional example shown in FIG. 13, the newly installed wireless node is required to access the previously installed and adjacent wireless node using wireless communication, so that there was a problem that the wireless node can be installed in only a place capable of surely conducting the wireless communication with the previously installed wireless node and an installation place is restricted in the case of installing a new wireless node.

Further, it is difficult for an on-site operator to decide whether or not wireless communication with the previously installed wireless node can surely be conducted in a location in which a wireless node attempts to be installed, and there has been further a problem that it becomes difficult to determine the installation place of the wireless node.

Also, there has been problems that distribution of a key for encryption or security authentication processing to a newly installed wireless node which is performed by the previously installed wireless node requires complicated processing and causes decrease in performance of a wireless network due to an increase in communication traffic.

Further, there has been a problem that a mechanism becomes complicated in time synchronization due to a factor such as instability of wireless communication environment although time synchronization between each of the wireless nodes is important in sleep time control etc. for electric power saving.

SUMMARY OF THE INVENTION

The present invention provides a wireless network construction system capable of improving flexibility in an installation place of a wireless node, and a wireless node installation support terminal.

According to a first aspect of the present invention, a wireless network construction system comprises:

first wireless nodes being previously installed in a wireless network;

a wireless node installation support terminal carried in a location capable of conducting wireless communication, said wireless node installation support terminal serving as a wireless node being previously installed in the wireless network; and a second wireless node being newly installed in the wireless network and adjacent to the wireless node installation support terminal, wherein the second wireless node performs a procedure of participation in the wireless network via the wireless node installation support terminal using the wireless communication, the wireless node installation support terminal allocates and distributes a network address to the second wireless node upon performing the procedure of participation in the wireless network, and the second wireless node performs a path search and establishes a wireless line between the first wireless nodes and the second wireless node.

According to a second aspect of the present invention, the wireless node installation support terminal may perform distribution of a key for encryption or security authentication processing to the second wireless node.

According to a third aspect of the present invention, the wireless node installation support terminal may synchronize time of the second wireless node.

According to a fourth aspect of the present invention, the wireless node installation support terminal may analyze a wireless communication state between wireless nodes or a radio wave state of the periphery and then display analyzed information.

According to a fifth aspect of the present invention, the wireless network construction system may be applied to a plant control system.

According to a sixth aspect of the present invention, the wireless network construction system may be applied to a building automation system.

According to a seventh aspect of the present invention, the wireless node installation support terminal comprises:

a wireless communication means for conducting the wireless communication with the second wireless node;

a storage means;

a display means; and an operation control means for controlling the wireless node installation support terminal and also allocating and distributing the network address to the second wireless node based on network address information stored in the storage means upon performing the procedure of participation in the wireless network from the second wireless node via the wireless communication means.

According to an eighth aspect of the present invention, the operation control means may perform distribution of a key for encryption stored in the storage means or security authentication processing to the second wireless node.

According to a ninth aspect of the present invention, the operation control means may synchronize time of the second wireless node.

According to a tenth aspect of the present invention, the operation control means may analyze a wireless communication state between wireless nodes or a radio wave state of the periphery and displays analyzed information on the display means.

According to an eleventh aspect of the present invention, the wireless network construction system may be applied to a plant control system.

According to a twelfth aspect of the present invention, the wireless network construction system may be applied to a building automation system.

According to a thirteenth aspect of the present invention, the operation control means may investigate radio wave environment of the first wireless nodes and the wireless node installation support terminal in an installation location of the second wireless node and then determine communication setting information of the second wireless node, which is stored in the storage means and suitable for the installation location.

According to a fourteenth aspect of the present invention, the operation control means may send sending output information to the second wireless node based on the communication setting information.

According to a fifteenth aspect of the present invention, the operation control means may send reception sensitivity information to the second wireless node based on the communication setting information.

According to a sixteenth aspect of the present invention, the operation control means may send information about the number of data resendings to the second wireless node based on the communication setting information.

According to the first to seventh aspects of the present invention, upon installing a new wireless node, an installation location is not restricted and flexibility in the installation location of the wireless node can be improved.

According to the second to eighth aspects of the present invention, complicated processing is performed by the wireless node installation support terminal and an increase in communication traffic is also suppressed and thus a decrease in performance of the wireless network can be prevented.

According to the third to ninth aspects of the present invention, stability of wireless communication environment improves and time synchronization is facilitated.

According to the fourth to tenth aspects of the present invention, it can easily be determined whether or not a location to install the wireless node is proper, and thus the wireless network is constructed more efficiently.

According to the fifth to eleventh aspects of the present invention, the wireless network is applied to the plant control system so that the wireless network is constructed more easily and efficiently According to the sixth to twelfth aspects of the present invention, the wireless network is applied to a building automation system so that the wireless network is constructed more easily and efficiency.

According to the thirteenth to sixteenth aspects of the present invention, setting work as to wireless communication of the wireless node can be performed easily.

DETAILED DESCRIPTION OF EXEMPLARY EMBODIMENTS

Figure 1:
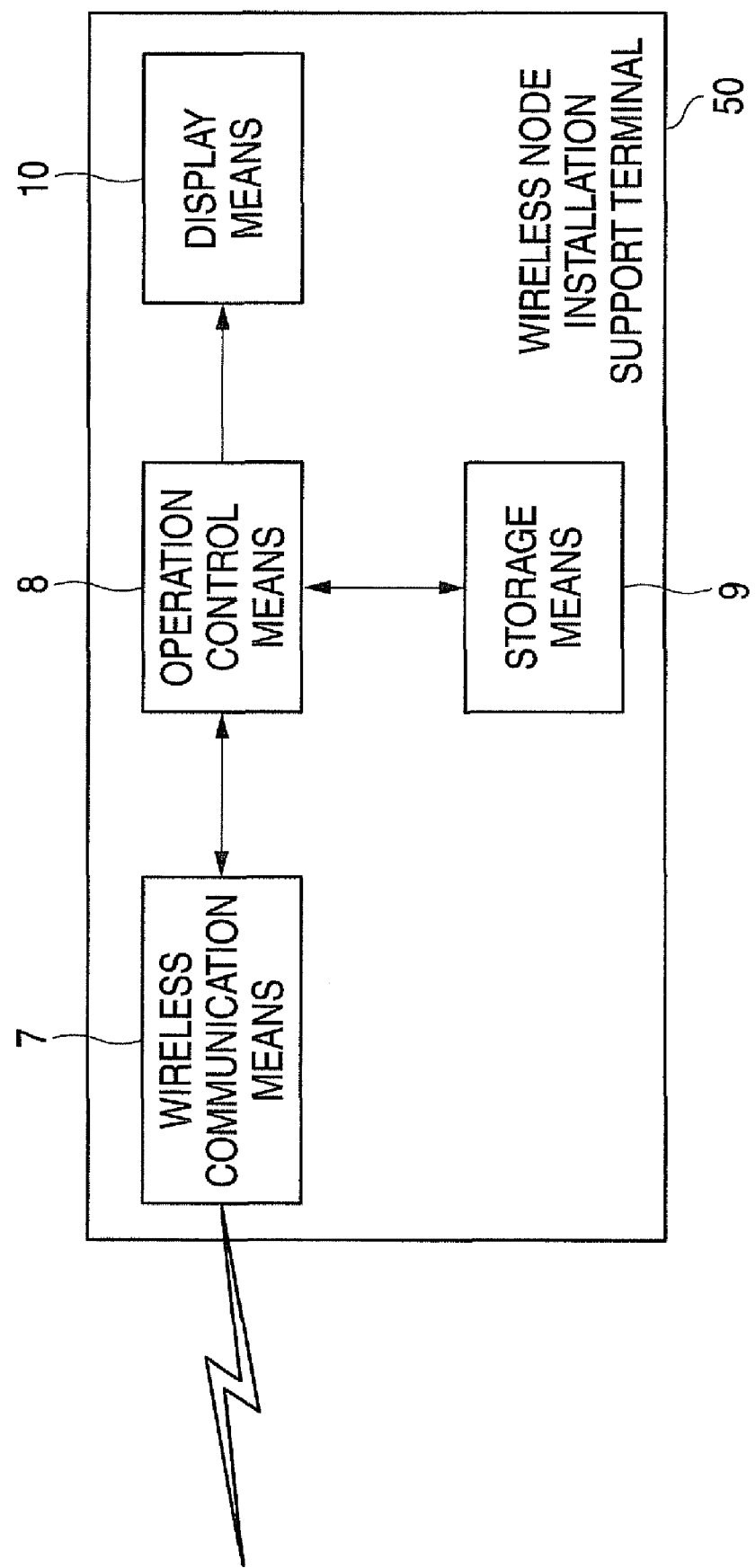
FIG. 1 is a configuration block diagram showing one embodiment of a wireless node installation support terminal used in a wireless network construction system according to the present invention.

Exemplary embodiments will hereinafter be described in detail with the drawings. FIG. 1 is a configuration block diagram showing one embodiment of a wireless node installation support terminal used in wireless network construction according to the present invention.

In FIG. 1, a wireless communication means 7 conducts wireless communication between wireless nodes, and an operation control means 8 controls an operation of the whole wireless node installation support terminal, and a storage means 9 stores a program, various parameters, network address information, a key for encryption, etc., and a display means 10 is e.g., a Light Emitting Diode (LED) display or a Liquid Crystal Display (LCD). Also, the wireless communication means 7, the operation control means 8, the storage means 9 and the display means 10 constitute a wireless node installation support terminal 50.

The wireless communication means 7 conducts wireless communication between each of the wireless nodes (not shown) through a wireless line of an ad hoc wireless network and also the input and output are mutually connected to the operation control means 8. Also, the input and output of the storage means 9 are mutually connected to the operation control means 8. Also, the display output of the operation control means 8 is inputted to the display means 10.

An operation of the wireless node installation support terminal shown in FIG. 1 will herein be briefly described. The operation control means 8 of the wireless node installation support terminal 50 reads out a program stored in the storage means 9 and executes the program and controls the wireless communication means 7, and then conducts wireless communication with a newly installed wireless node through the ad hoc wireless network, and allocates a network address to the newly installed wireless node based on network address information stored in the storage means 9.

Also, the operation control means 8 of the wireless node installation support terminal 50 controls the wireless communication means 7, and conducts wireless communication with a newly installed wireless node through the ad hoc wireless network. As necessary, the operation control means 8 performs distribution of a key for encryption stored in the storage means 9 or security authentication processing to the newly installed wireless node, thus to synchronize time of the newly installed wireless node.

Further, the operation control means 8 of the wireless node installation support terminal 50 properly displays necessary information etc. on the display means 10.

Next, an operation as the whole wireless node installation support terminal 50 will hereinafter be described without referring to a configuration of the wireless node installation support terminal 50 for a brief description.

Figure 2:
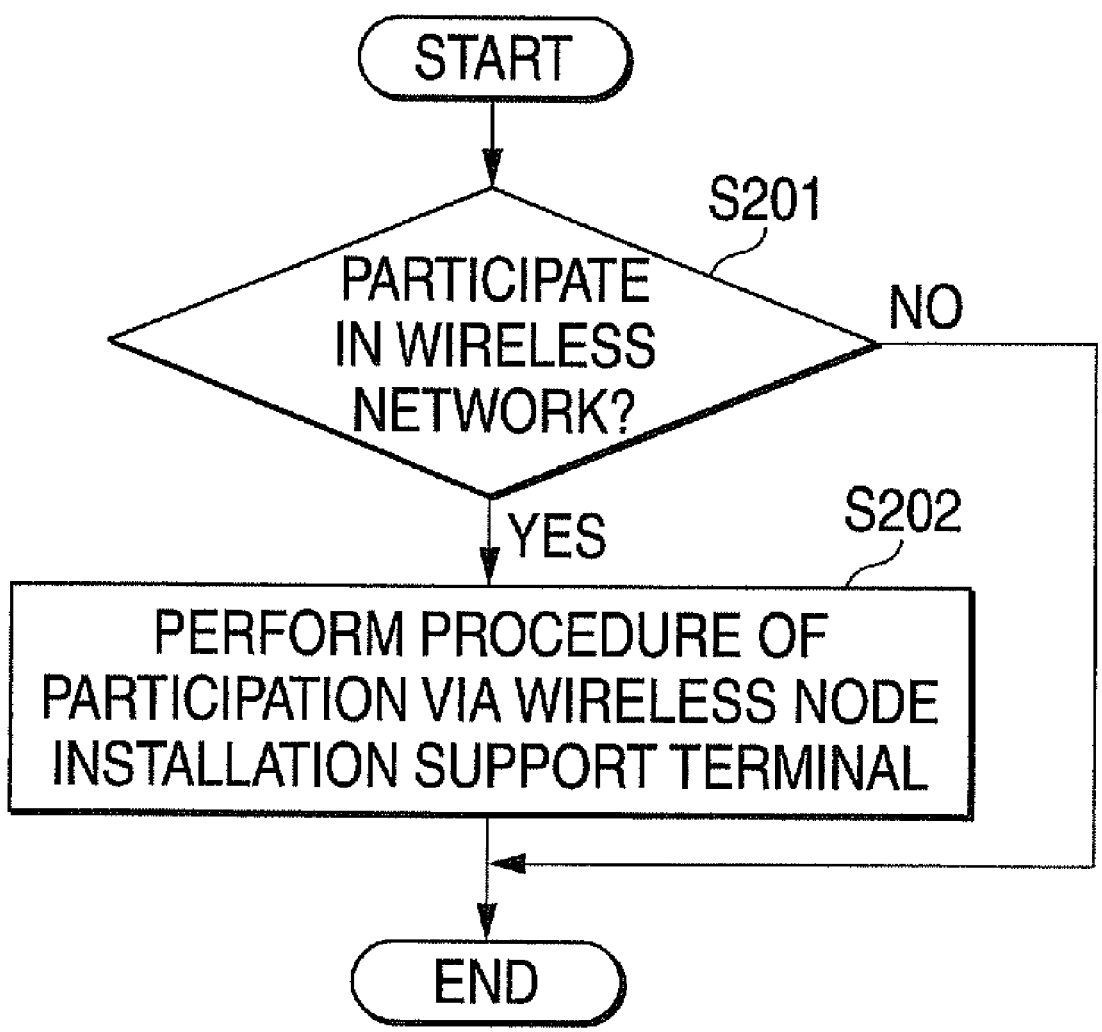
FIG. 2 is a flow diagram for explaining an operation of a newly installed wireless node.
Figure 3:
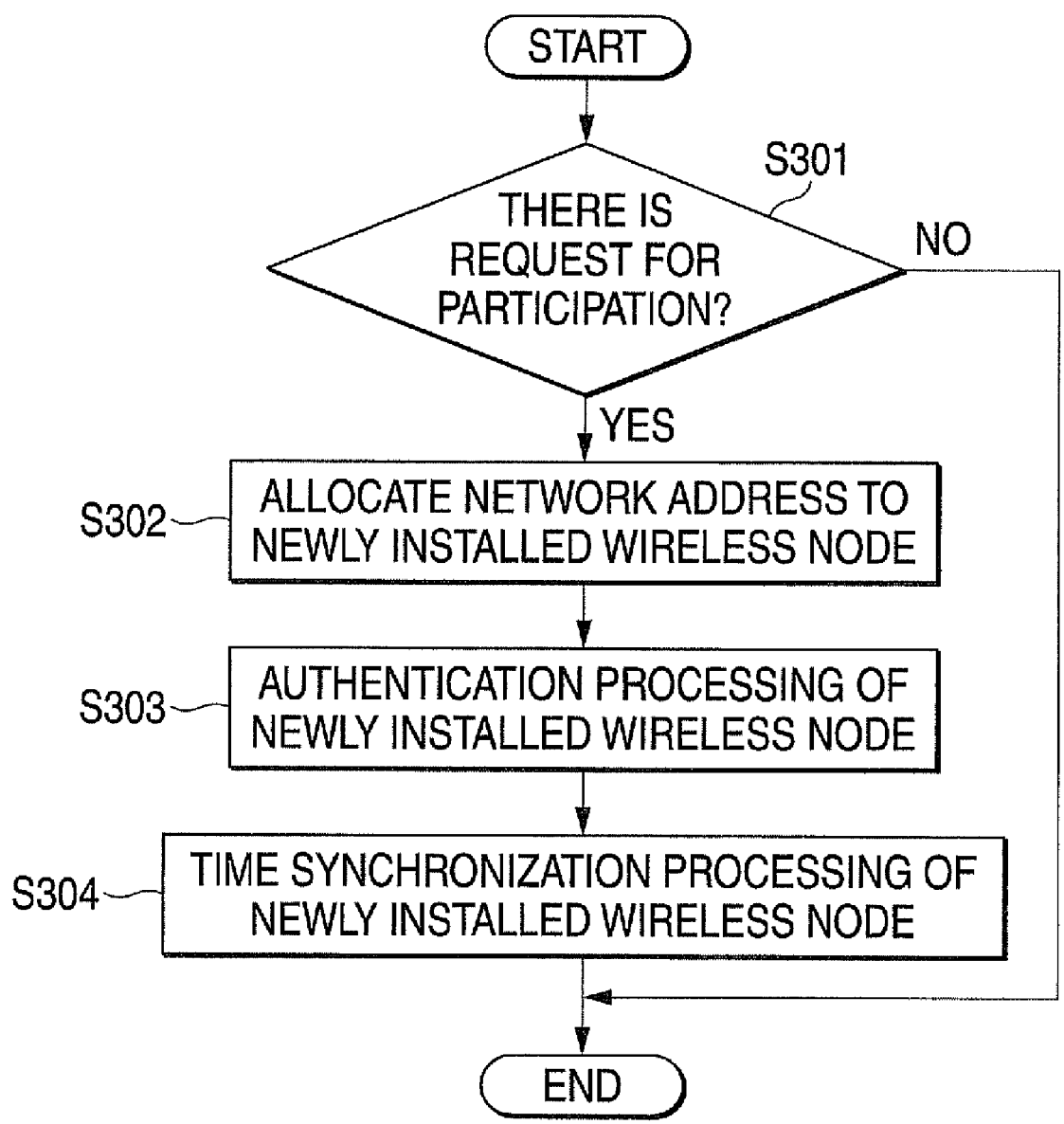
FIG. 3 is a flow diagram for explaining an operation of a wireless node installation support terminal.

Further, a wireless network construction system using such a wireless node installation support terminal will herein be described using FIGS. 2 to 9. FIG. 2 is a flow diagram for explaining an operation of a newly installed wireless node, and FIG. 3 is a flow diagram for explaining an operation of the wireless node installation support terminal 50. FIGS. 4 to 9 are explanatory diagrams for explaining a state of wireless network construction.

Also, in FIGS. 4 to 9, wireless nodes 11, 12, 13, 14, 15 and 16 construct an ad hoc wireless network and conduct communication through the wireless network, and the same numeral as that of FIG. 1 is assigned to numeral 50.

Also, each of the wireless nodes does not have functions of performing processing of time synchronization, key distribution, authentication, distribution, allocation, etc. of a network address to a newly installed wireless node. Each of the wireless nodes performs a procedure of participation in a wireless network via only the wireless node installation support terminal.

Further, the wireless node installation support terminal 50 is carried by an operator etc. in a location capable of surely conducting wireless communication with the newly installed wireless node, and operates as a previously installed and adjacent wireless node in the conventional example.

In "S201" in FIG. 2, a newly installed wireless node decides whether or not to participate in the existing wireless network. In the case of deciding to participate in the existing wireless network in "S201" in FIG. 2, the newly installed wireless node performs a procedure of participation in the wireless network via the wireless node installation support terminal 50 (corresponding to the previously installed and adjacent wireless node) using wireless communication, and performs a path search and thus establishes a wireless line in "S202" in FIG. 2.

On the other hand, in "S301" in FIG. 3, the wireless node installation support terminal 50 (corresponding to the previously installed and adjacent wireless node) decides whether or not there was a request for participation in the wireless network from the newly installed wireless node. In the case of deciding that there was the request for participation, the wireless node installation support terminal 50 (corresponding to the previously installed and adjacent wireless node) allocates and distributes a network address to the newly installed wireless node in "S302" in FIG. 3.

Then, as necessary, the wireless node installation support terminal 50 (corresponding to the previously installed and adjacent wireless node) performs distribution of a key for encryption or security authentication processing to the newly installed wireless node in "S303" in FIG. 3, and then synchronizes time of the newly installed wireless node in "S304" in FIG. 3.

Figure 4:
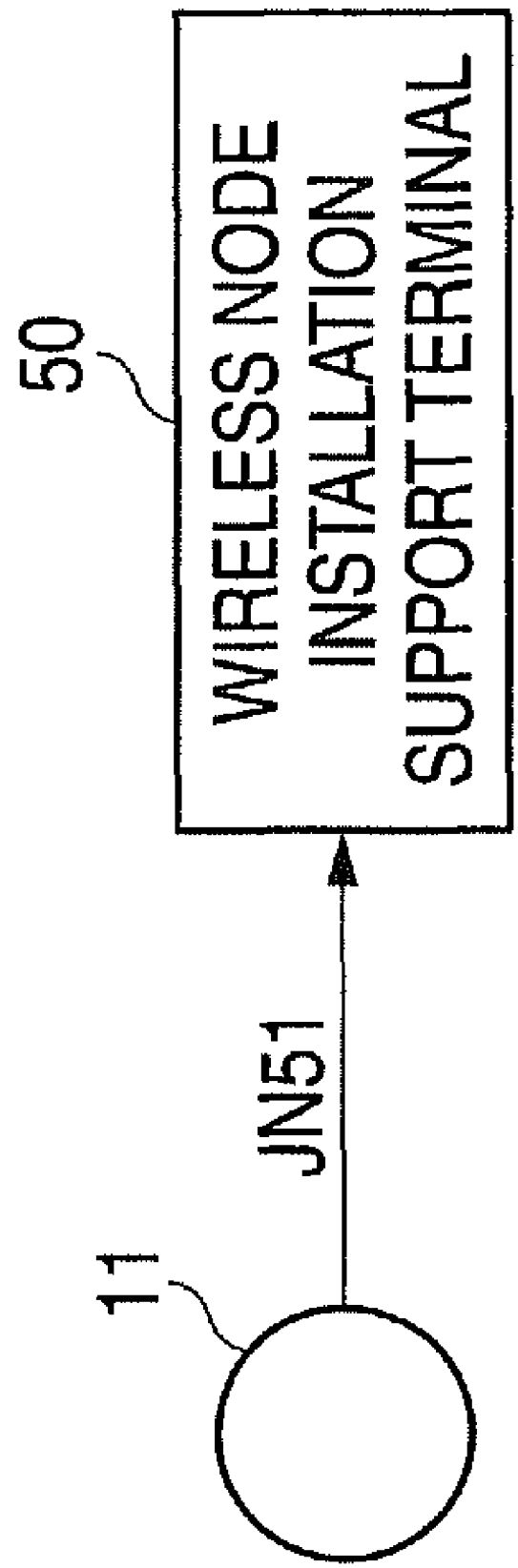
FIG. 4 is an explanatory diagram for explaining a state of wireless network construction.

For example, as shown in FIG. 4, when it is assumed that a wireless node 11 is newly installed, the newly installed wireless node 11 performs a procedure of participation in a wireless network via the wireless node installation support terminal 50 (corresponding to the previously installed and adjacent wireless node) as shown by "JN51" in FIG. 4, and then the wireless node installation support terminal 50 (corresponding to the previously installed and adjacent wireless node) performs processing of time synchronization, key distribution, authentication, distribution, allocation, etc. of a network address to the newly installed wireless node 11.

Figure 5:
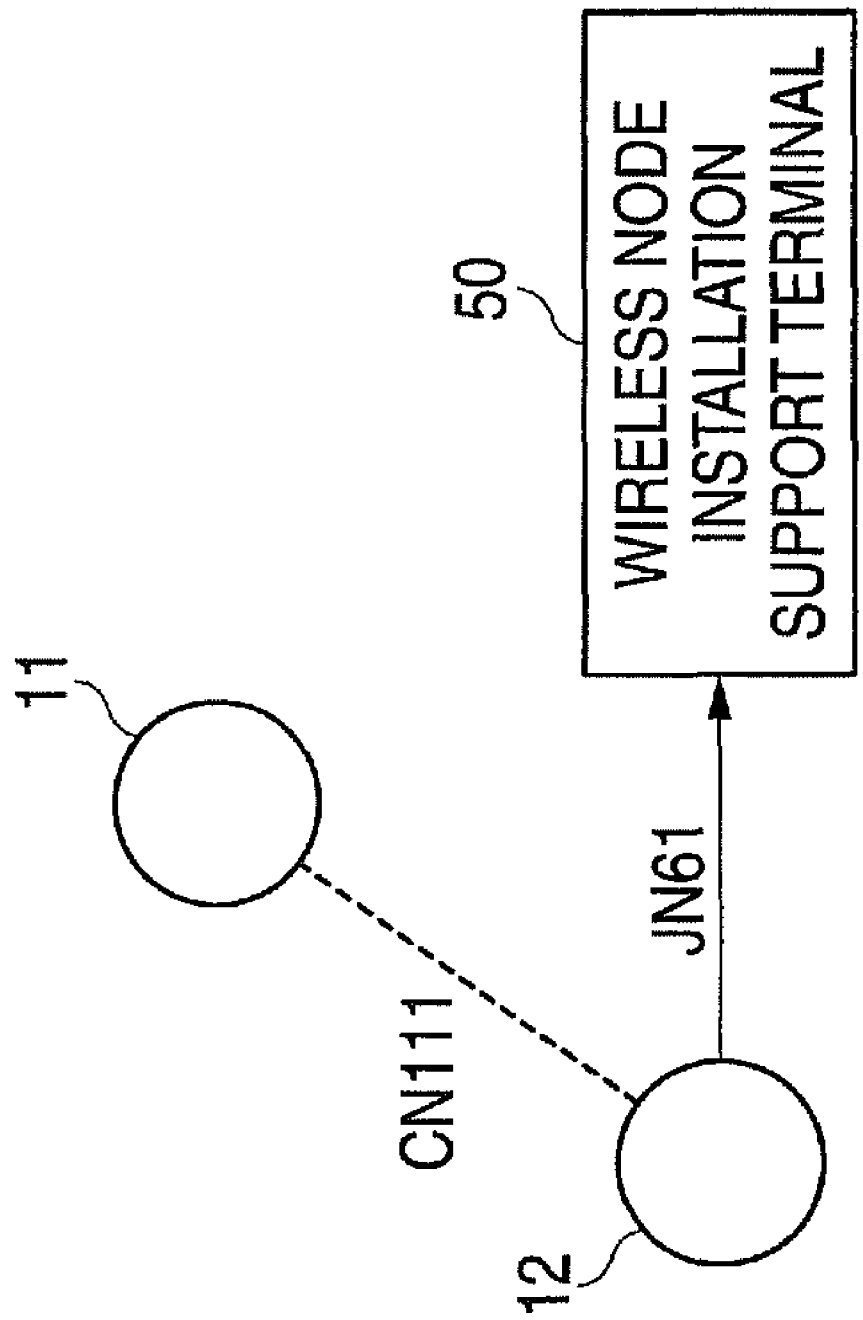
FIG. 5 is an explanatory diagram for explaining a state of the wireless network construction.

When a wireless node 12 is newly installed in such the constructed wireless network, the newly installed wireless node 12 performs a procedure of participation in the wireless network via the wireless node installation support terminal 50 (corresponding to the previously installed and adjacent wireless node) as shown by "JN61" in FIG. 5, and then the wireless node installation support terminal 50 (corresponding to the previously installed and adjacent wireless node) performs processing of time synchronization, key distribution, authentication, distribution, allocation, etc. of a network address to the newly installed wireless node 12. Then, the newly installed wireless node 12 performs a path search and establishes a wireless line as shown by "CN111" in FIG. 5.

Figure 6:
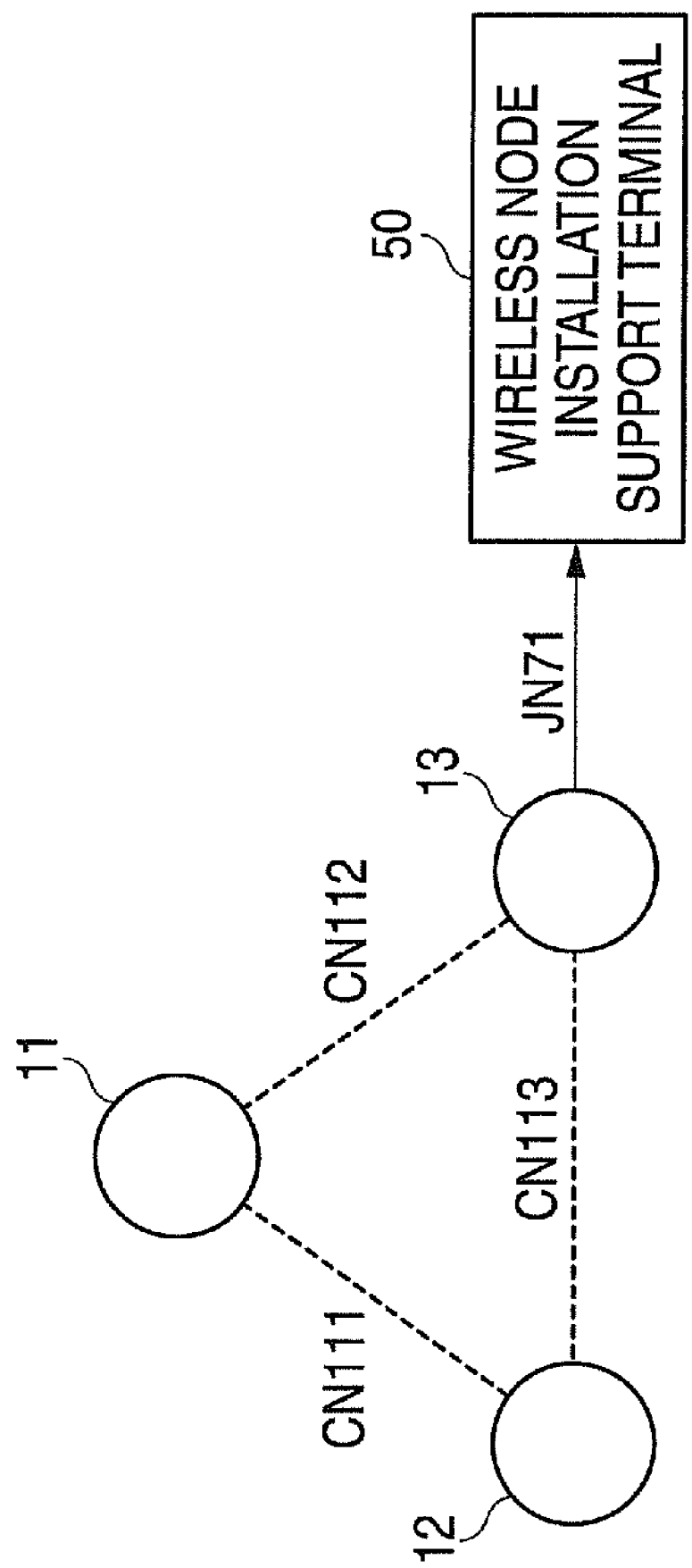
FIG. 6 is an explanatory diagram for explaining a state of the wireless network construction.

Similarly, a newly installed wireless node 13 performs a procedure of participation in the wireless network via the wireless node installation support terminal 50 (corresponding to the previously installed and adjacent wireless node) as shown by "JN71" in FIG. 6, and then the wireless node installation support terminal 50 (corresponding to the previously installed and adjacent wireless node) performs processing of time synchronization, key distribution, authentication, distribution, allocation, etc. of a network address to the newly installed wireless node 13. Then, the newly installed wireless node 13 performs a path search and establishes wireless lines as shown by "CN112" and "CN113" in FIG. 6.

Figure 7:
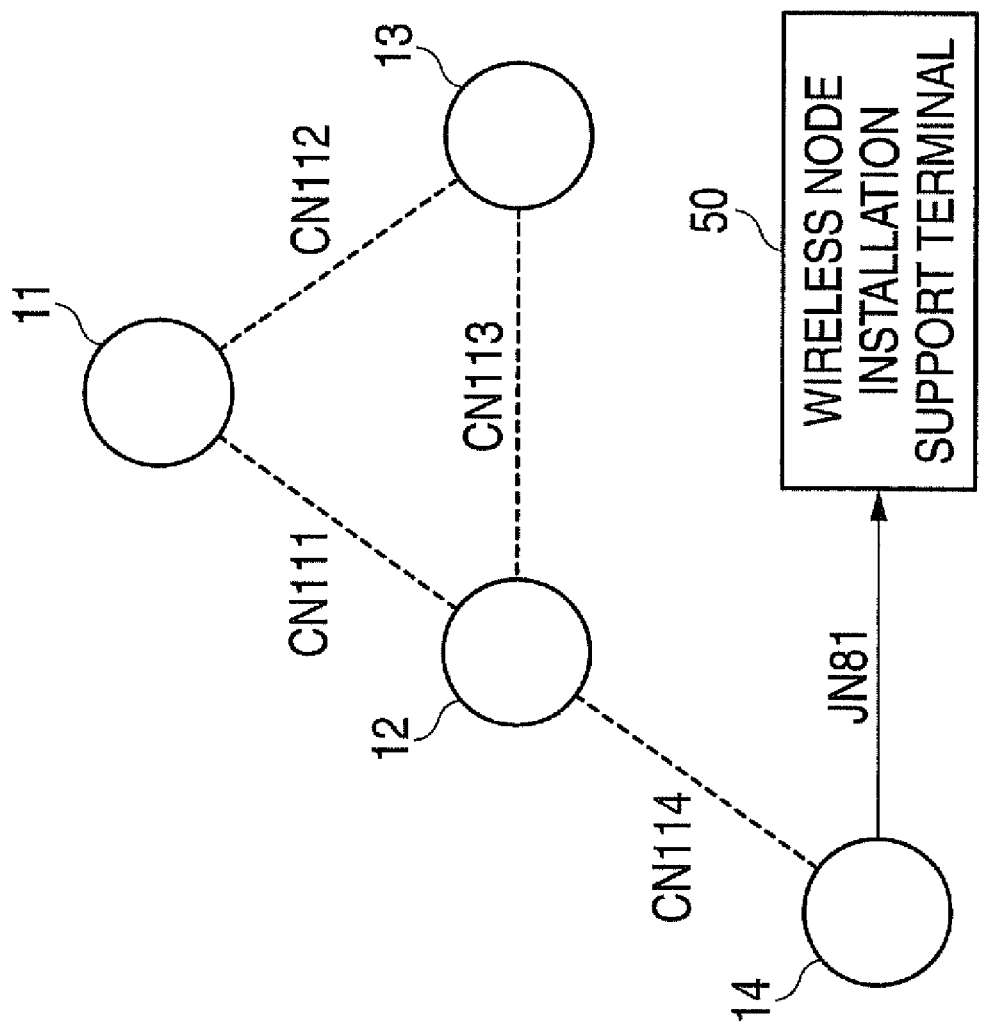
FIG. 7 is an explanatory diagram for explaining a state of the wireless network construction.

Also, a newly installed wireless node 14 performs a procedure of participation in the wireless network via the wireless node installation support terminal 50 (corresponding to the previously installed and adjacent wireless node) as shown by "JN81" in FIG. 7, and the wireless node installation support terminal 50 (corresponding to the previously installed and adjacent wireless node) performs processing of time synchronization, key distribution, authentication, distribution, allocation, etc. of a network address to the newly installed wireless node 14. Then, the newly installed wireless node 14 performs a path search and establishes a wireless line as shown by "CN114" in FIG. 7.

Figure 8:
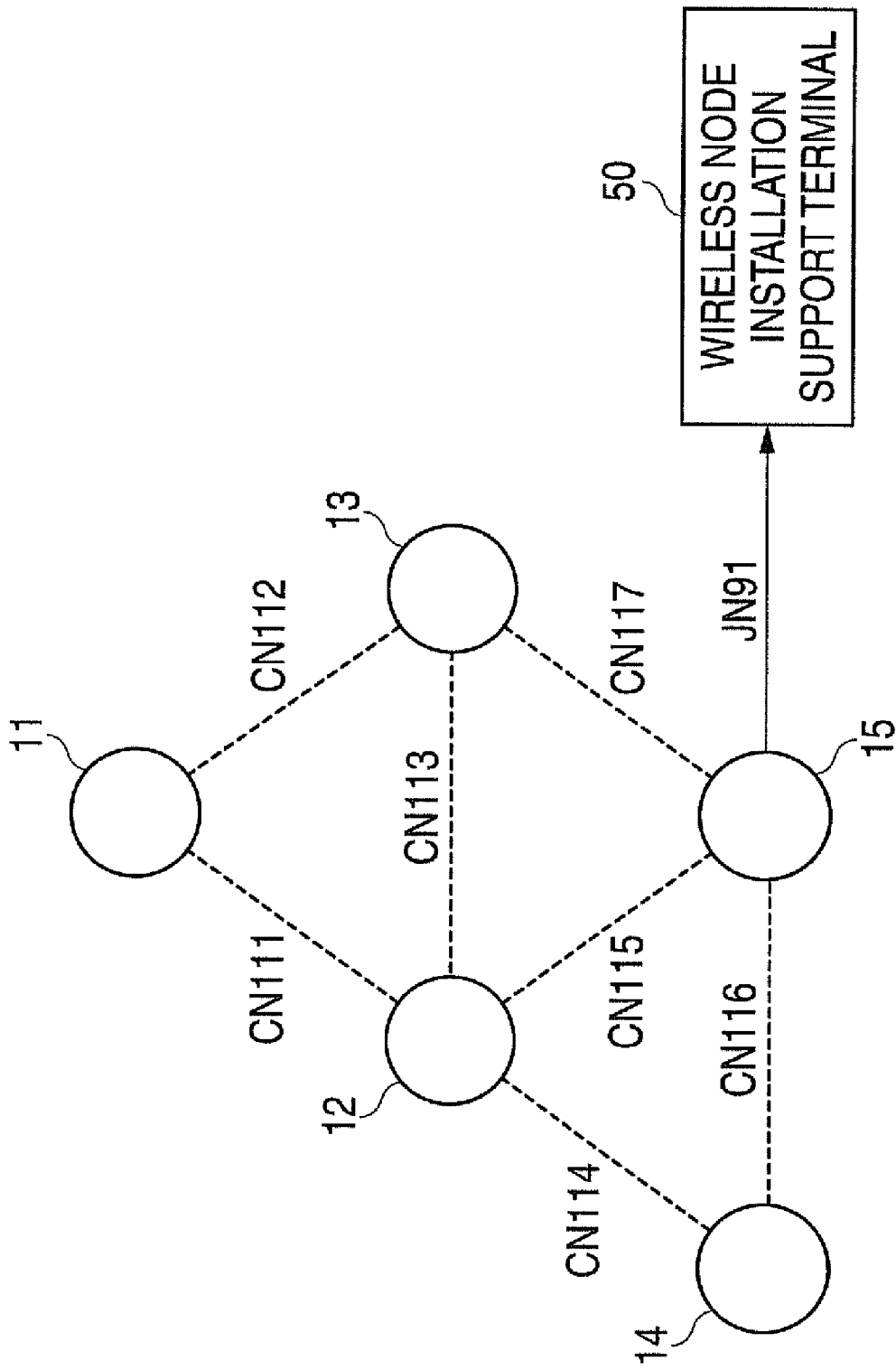
FIG. 8 is an explanatory diagram for explaining a state of the wireless network construction.

Also, a newly installed wireless node 15 performs a procedure of participation in the wireless network via the wireless node installation support terminal 50 (corresponding to the previously installed and adjacent wireless node) as shown by "JN91" in FIG. 8, and the wireless node installation support terminal 50 (corresponding to the previously installed and adjacent wireless node) performs processing of time synchronization, key distribution, authentication, distribution, allocation, etc. of a network address to the newly installed wireless node 15. Then, the newly installed wireless node 15 performs a path search and establishes wireless lines as shown by "CN115", "CN116" and "CN117" in FIG. 8.

Figure 9:
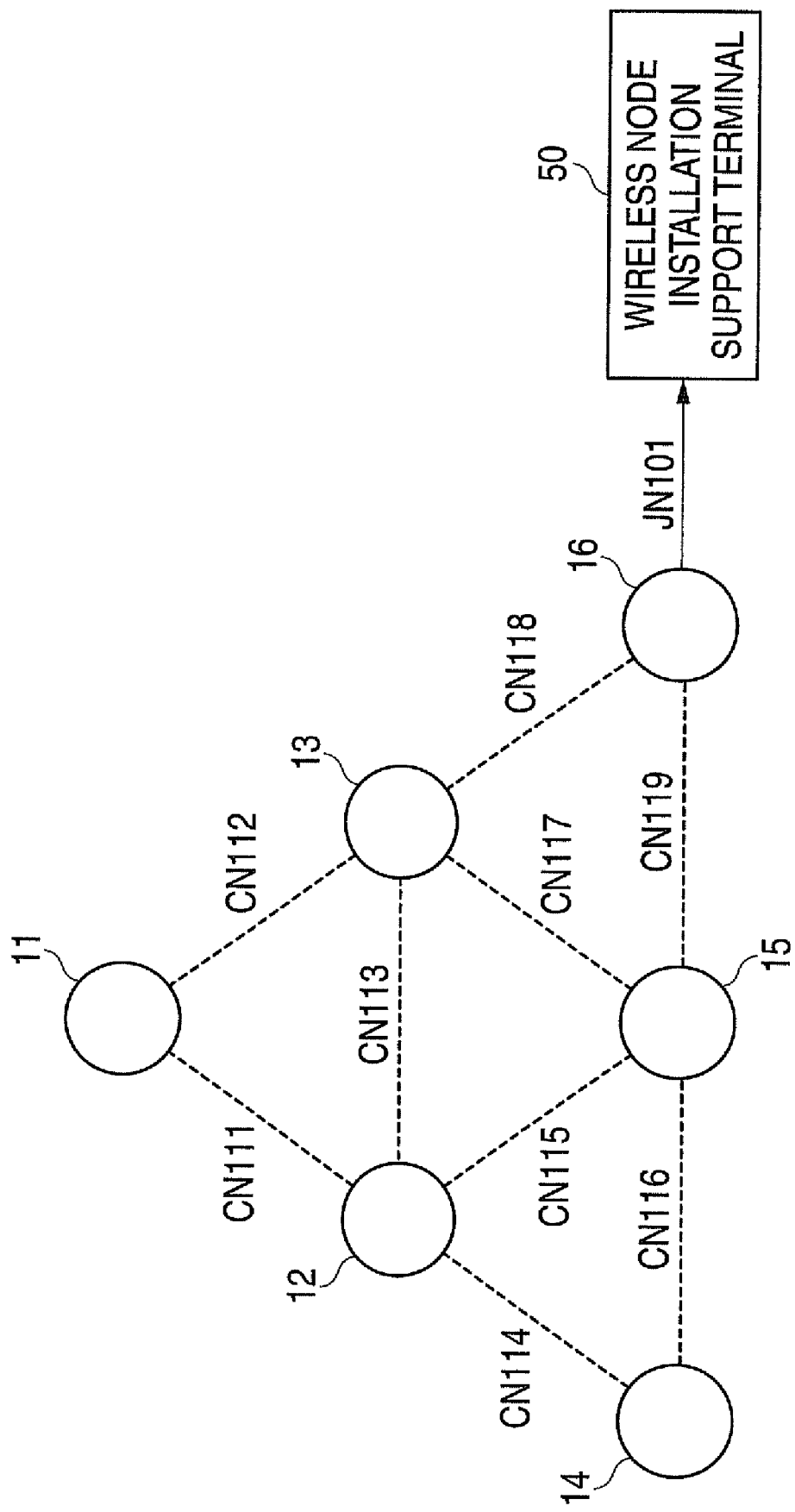
FIG. 9 is an explanatory diagram for explaining a state of the wireless network construction.

Finally, a newly installed wireless node 16 performs a procedure of participation in the wireless network via the wireless node installation support terminal 50 (corresponding to the previously installed and adjacent wireless node) as shown by "JN11" in FIG. 9, and the wireless node installation support terminal 50 (corresponding to the previously installed and adjacent wireless node) performs processing of time synchronization, key distribution, authentication, distribution, allocation, etc. of a network address to the newly installed wireless node 16. Then, the newly installed wireless node 16 performs a path search and establishes wireless lines as shown by "CN118" and "CN119" in FIG. 9.

As a result, all the newly installed wireless nodes perform the procedures of participation in the wireless network via the wireless node installation support terminal, which corresponds to the previously installed and adjacent wireless node and is carried in a location capable of surely conducting wireless communication. Therefore, in the case of installing the new wireless node, an installation place is not restricted and flexibility in the installation place of the wireless node can be improved.

Also, distribution of a key for encryption or security authentication processing to the newly installed wireless node is performed by the wireless node installation support terminal, so that complicated processing is performed by the wireless node installation support terminal and an increase in communication traffic is also suppressed and a decrease in performance of a wireless network can be prevented.

Further, the wireless node installation support terminal is carried in a location capable of surely conducting wireless communication with the newly installed wireless node, so that stability of wireless communication environment improves and time synchronization is facilitated.

In addition, in description of the wireless network construction system of FIG. 1 etc., a newly installed wireless node performs a path search and establishes a wireless line at the time of a procedure of participation in a wireless network, but path searches may simultaneously be performed to establish wireless lines after all the wireless nodes are installed once.

Also, an algorithm of the path search is not limited, and any path search algorithm may be used.

Also, in description of the wireless network construction system of FIG. 1 etc., a wireless node installation support terminal performs processing of time synchronization, key distribution, authentication, distribution, allocation, etc. of a network address to a newly installed wireless node, but processing of time synchronization, key distribution, authentication, etc. to an unnecessary wireless node may be omitted naturally.

Also, any allocation methods such as a method for sequentially allocating a network address to a wireless node for performing a procedure of participation in a wireless network or a method for fixedly allocating any network address to a particular wireless node may be used as an allocation method of a network address to a newly installed wireless node of a wireless node installation support terminal.

Also, in description of the wireless network construction system of FIG. 1 etc., a network is constructed in order while establishing a wireless line between a newly installed wireless node and a previously installed wireless node. However, a wireless network may be constructed as a whole by properly arranging a relay wireless node after a wireless node is installed in a measurement point etc. without being conscious of installation order of the wireless node. In this case, the wireless network can be constructed easily.

Also, in description of the wireless network construction system of FIG. 1 etc., when a newly installed wireless node decides to participate in the existing wireless network, the wireless node performs a procedure of participation in the wireless network via a wireless node installation support terminal using wireless communication, but the procedure of participation in the wireless network for the wireless node installation support terminal using wireless communication may always be performed without making the decision.

Also, in the wireless network construction system of FIG. 1 etc., a wireless node performs a procedure of participation in a wireless network via only a wireless node installation support terminal. In other words, the wireless network cannot be constructed unless the wireless node installation support terminal 50 is used, so that security of the constructed wireless network can be ensured by properly operating and managing the wireless node installation support terminal 50.

Also, the operation control means 8 of the wireless node installation support terminal 50 may analyze a wireless communication state between wireless nodes or a radio wave state of the periphery using the wireless communication means 7 and thus display analyzed information on the display means 10.

For example, the wireless communication state between wireless nodes or the radio wave state of the periphery is displayed by visualizing the periphery two-dimensionally or three-dimensionally.

In this case, an operator etc. in an installation site can check the wireless communication state between wireless nodes or the radio wave state of the periphery, so that it can easily be analyzed whether or not a place to install the wireless node is proper, and thus the wireless network is constructed more efficiently.

Also, in description of the embodiment shown in FIG. 1, it is simply represented as a wireless network, but wireless networks of any standards can be applied. For example, "ZigBee (IEEE802.15.4) (registered trademark)" may be used naturally.

Also, contribution to reduction in management cost, improvement in operation performance, extensibility of the whole system, etc. can further be expected by mutually linking a wireless node installation support terminal to a conventional fixed server.

For example, a system management server may operate in the system center such as a main computer room as usual and add a function of synchronizing with the system management server and sharing its function to a wireless node installation support terminal.

In this case, it becomes easy to perform synchronization or sharing of information between wireless networks, and flexibility or confirmation can be improved in the system operation side. Also, in a system operating over the long term, a large effect in improvement in reliability and simplicity can be expected in information management of a wireless node or durability of data.

Also, the embodiment shown in FIG. 1 is effectively applied to the following systems etc.

(1) Plant control system
(2) Building automation system (1) In a plant control system, there are many obstacles (facilities etc.) inside a plant structure in which a wireless node is installed, and radio interference also tends to occur. Thus, all the newly installed wireless nodes perform procedures of participation in a wireless network via a wireless node installation support terminal, which corresponds to a previously installed and adjacent wireless node and is carried in a location capable of surely conducting wireless communication, so that the wireless network is constructed more easily and efficiently.

(2) In a building automation system, when illumination, a switch, etc. are used as a wireless node, there are also many obstacles (equipment, utensils, etc.) inside a building in which the wireless node is installed, and radio interference also tends to occur. Thus, all the newly installed wireless nodes perform procedures of participation in a wireless network via a wireless node installation support terminal, which corresponds to a previously installed and adjacent wireless node and is carried in a location capable of surely conducting wireless communication, so that the wireless network is constructed more easily and efficiently.

Also, in the wireless network as described above, there were cases where radio interference occurs by influence of interference waves etc. emitted from obstacles or other equipment depending on environment in which a wireless node is installed.

Thus, it is necessary for a wireless node to adjust settings as to wireless communication (hereinafter called communication setting) such as a communication frequency (channel), a reception sensitivity, a sending output according to environment in which the wireless node is installed.

Conventionally, communication setting of a wireless node was adjusted by storing parameters as to communication settings (hereinafter called communication setting information)—such as the number of data resendings, a sending output, reception sensitivity, etc. suitable for installation environment in advance—in storage means such as memory of the wireless node and loading the communication settings information at the time of starting the wireless node.

However, in such an adjustment method, when many wireless nodes are arranged, an operator goes in the field with respect to each of the wireless nodes and investigates radio wave environment in wireless communication and respectively stores the communication setting information suitable for installation environment in the storage means. Thus, there has been a problem that work related to settings is complicated and a setting error by the operator etc. occurs.

Also, when an installation place of a wireless node is changed, it is necessary to reset the communication setting information so as to be suitable for the installation place again, so that when installation places of many wireless nodes are changed, there has been the problem that work is complicated and a setting error by the operator etc. occurs as described above.

With respect to such a problem, the following method has been proposed. Namely, an operator investigates radio wave environment in wireless communication between a wireless node and another wireless node and obtains communication setting information suitable for installation environment and changes communication setting of the wireless node based on the communication setting information by infrared communication and other communication methods through a portable terminal or a control device, etc.

However, also in such an adjustment method, for a wireless network requiring a power-saving operation in battery driving, a wireless node sleeps in order to reduce power consumption. Therefore, there has been a problem that communication setting cannot be adjusted for the sleep period.

With respect to such conventional problems, using the wireless network construction system of FIG. 1 etc. of the present invention, a wireless node installation support terminal investigates radio wave environment of another wireless node previously participating in a wireless network and the wireless node installation support terminal in an installation place of a newly installed wireless node and then sends communication setting information suitable for the installation place to the wireless node, so that setting work as to wireless communication of the wireless node can be performed easily.

An operation of adjusting communication setting of a wireless node by a wireless network construction system using such a wireless node installation support terminal will herein be described briefly.

Incidentally, for brief description, the wireless node installation support terminal 50 have a radio wave environment investigation means (not shown) for investigating radio wave environment in wireless communication with a newly installed wireless node, and communication setting information about a sending output, reception sensitivity, the number of data sendings, etc. is stored in the storage means 9. Also, a wireless node have a operation control means for controlling an operation of the whole wireless node, and storage means for storing a program and the communication setting information.

The operation control means 8 of the wireless node installation support terminal 50 carried by an operator etc. controls the radio wave environment investigation means (not shown) and investigates radio wave environment of another wireless node participating in a wireless network and the wireless node installation support terminal 50 in an installation place of a newly installed wireless node.

Then, the operation control means 8 of the wireless node installation support terminal 50 determines communication setting information suitable for the installation place of the newly installed wireless node based on the investigated radio wave environment and thus stores the information in the storage means 9.

Also, the operation control means 8 of the wireless node installation support terminal 50 controls the wireless communication means 7 and conducts wireless communication with a newly installed wireless node and as necessary, the communication setting information about a sending output, reception sensitivity, the number of data sendings, etc. stored in the storage means 9 is sent.

The newly installed wireless node changes communication setting based on the communication setting information (for example, sending output information, reception sensitivity information, or information about the number of data resendings) suitable for installation environment received from the wireless node installation support terminal 50.

Further, the operation control means 8 of the wireless node installation support terminal 50 properly displays necessary information etc. on the display means 10.

Figure 10:
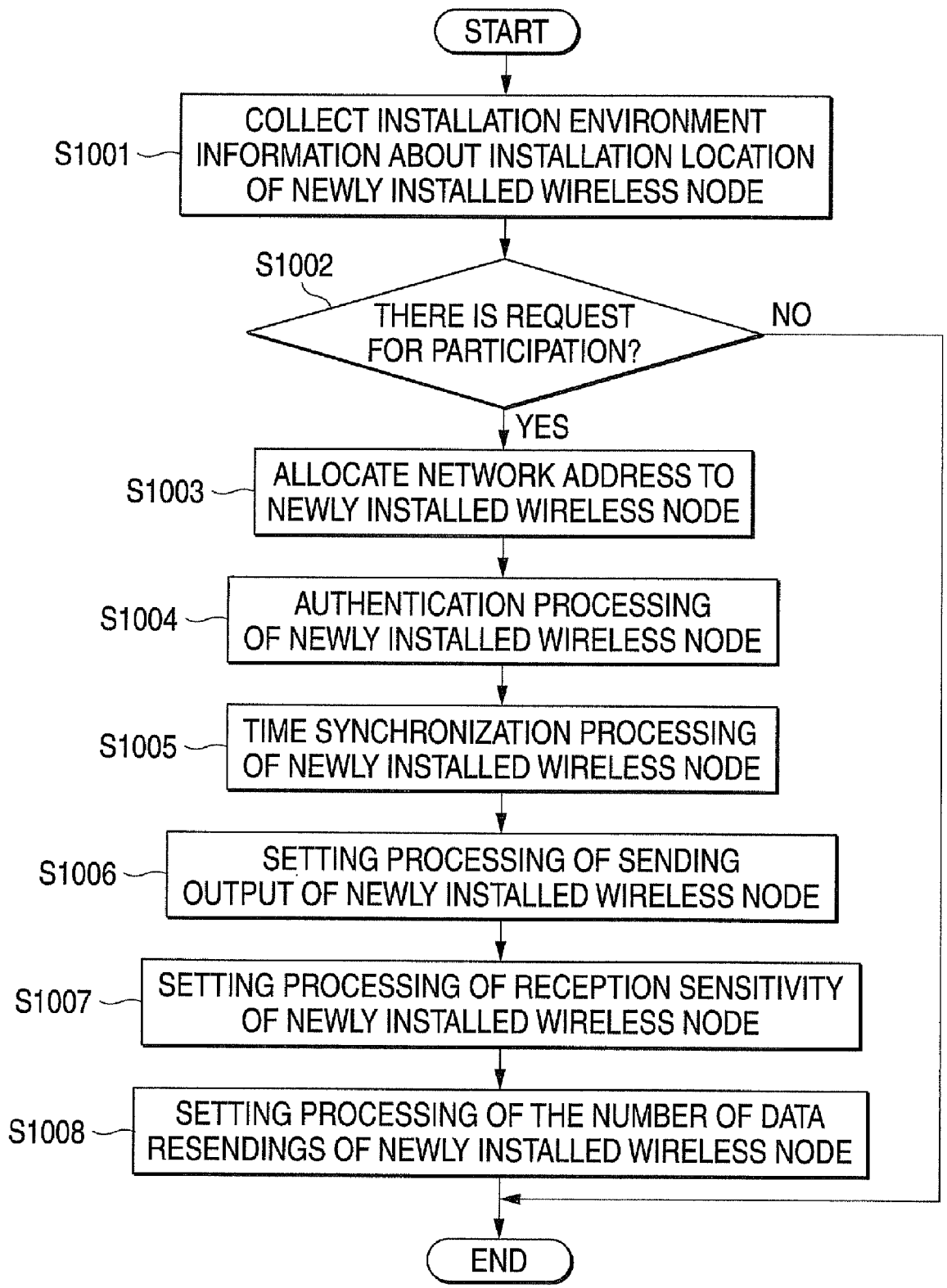
FIG. 10 is a flow diagram for explaining an operation of a wireless node installation support terminal.
Figure 11:
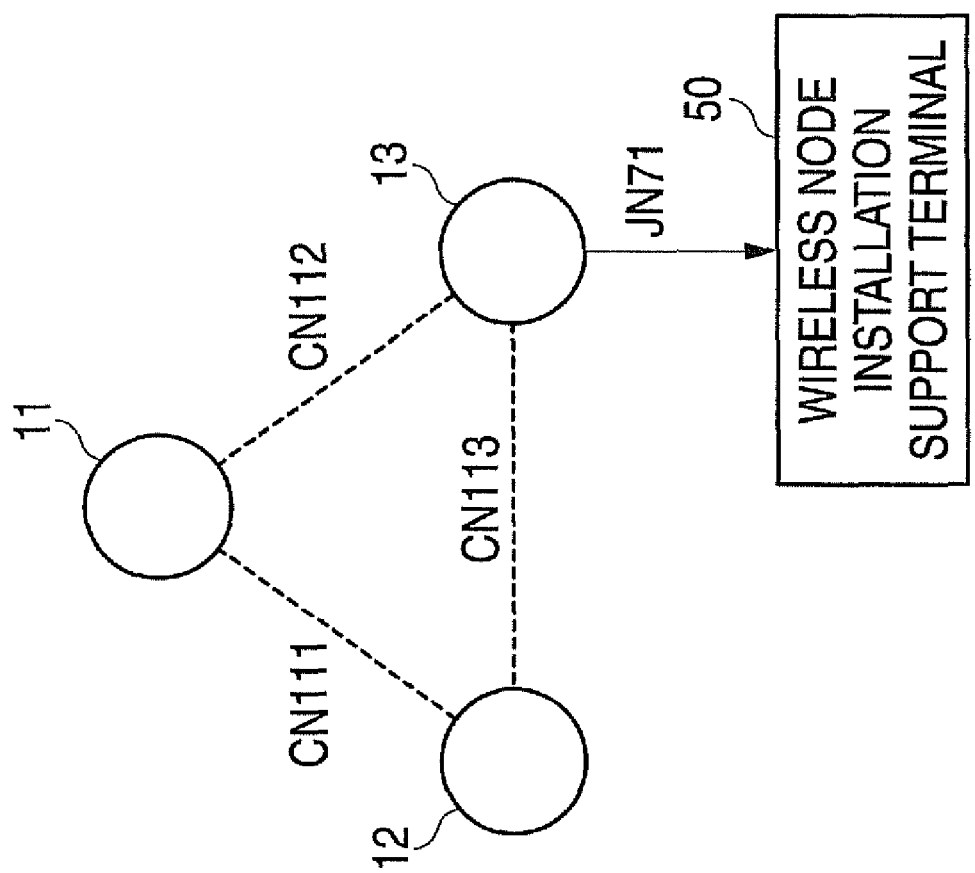
FIG. 11 is an explanatory diagram for explaining a state of wireless network construction.
Figure 12:
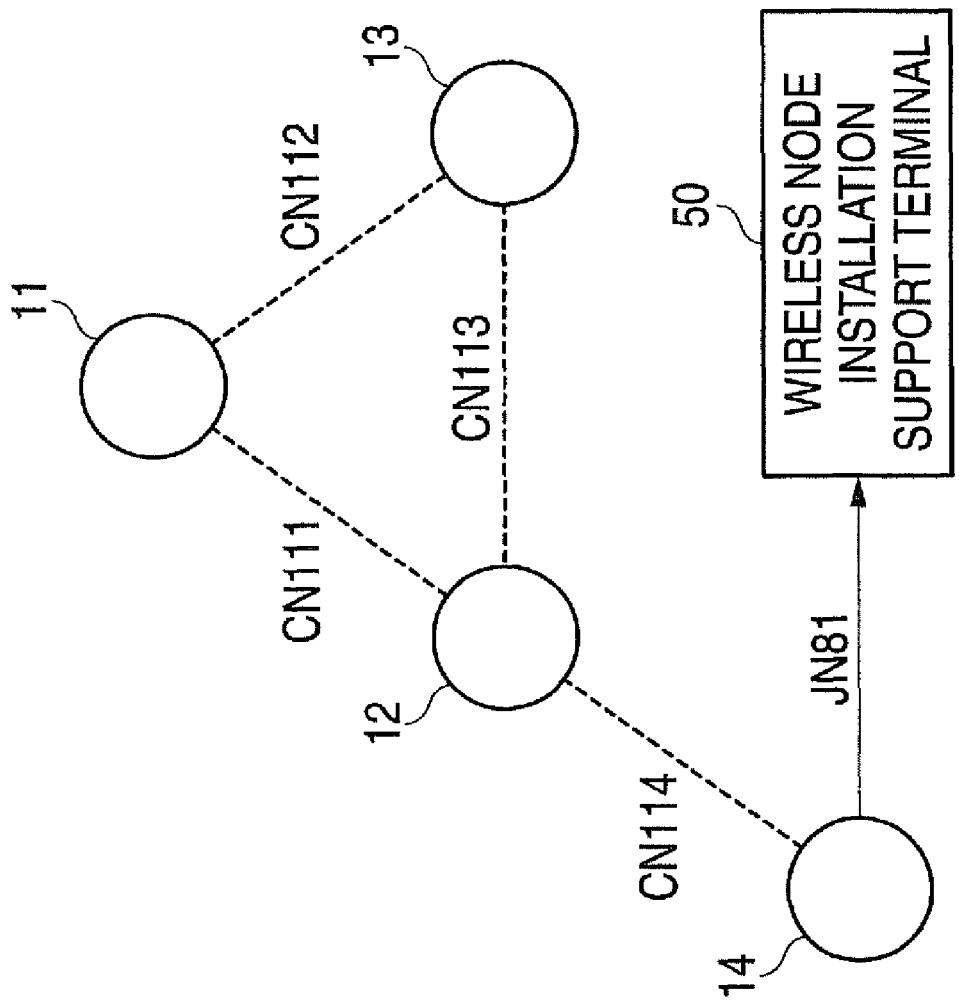
FIG. 12 is an explanatory diagram for explaining a state of the wireless network construction.
Figure 13:
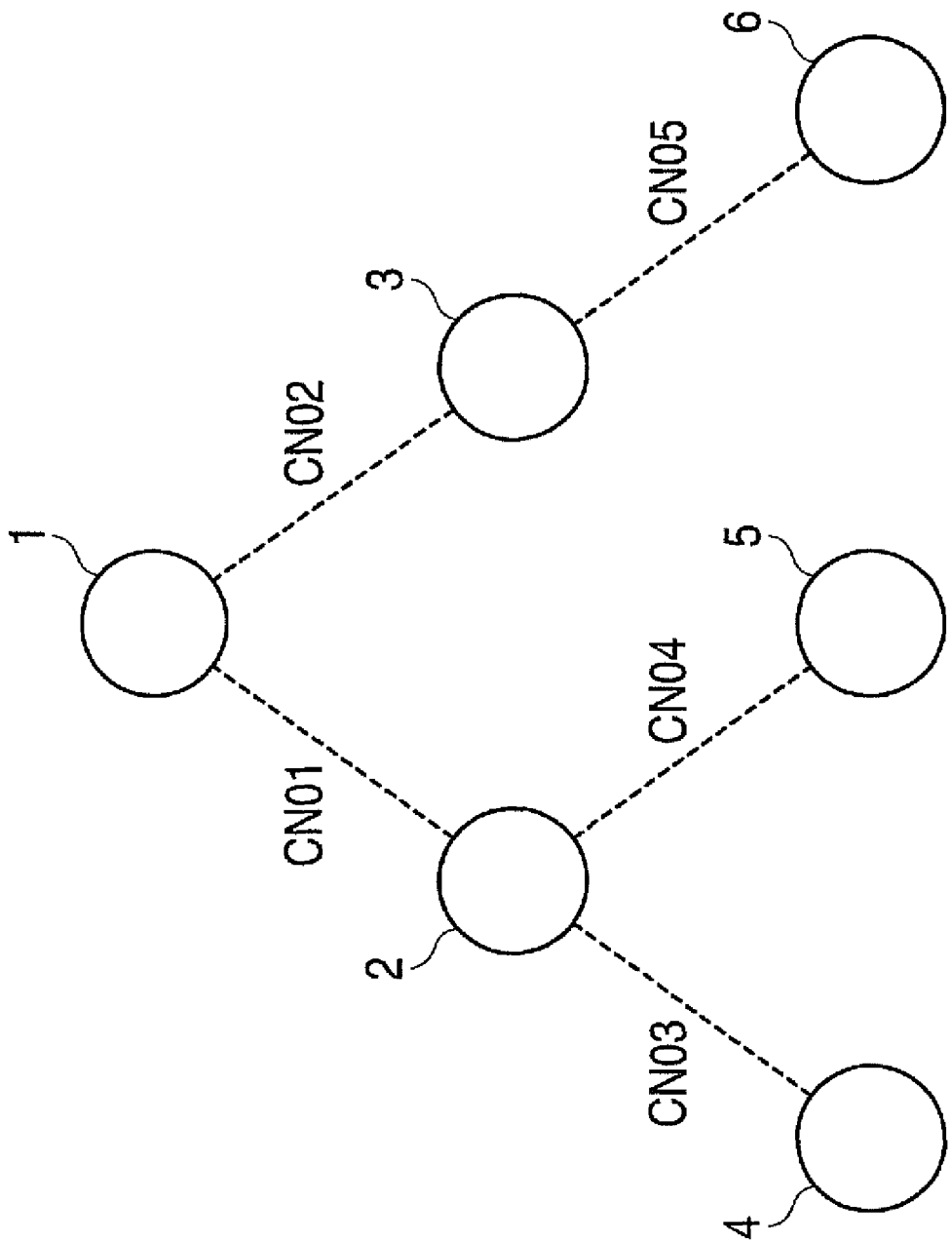
FIG. 13 is a configuration block diagram showing one example of a conventional ad hoc wireless network.
Figure 14:
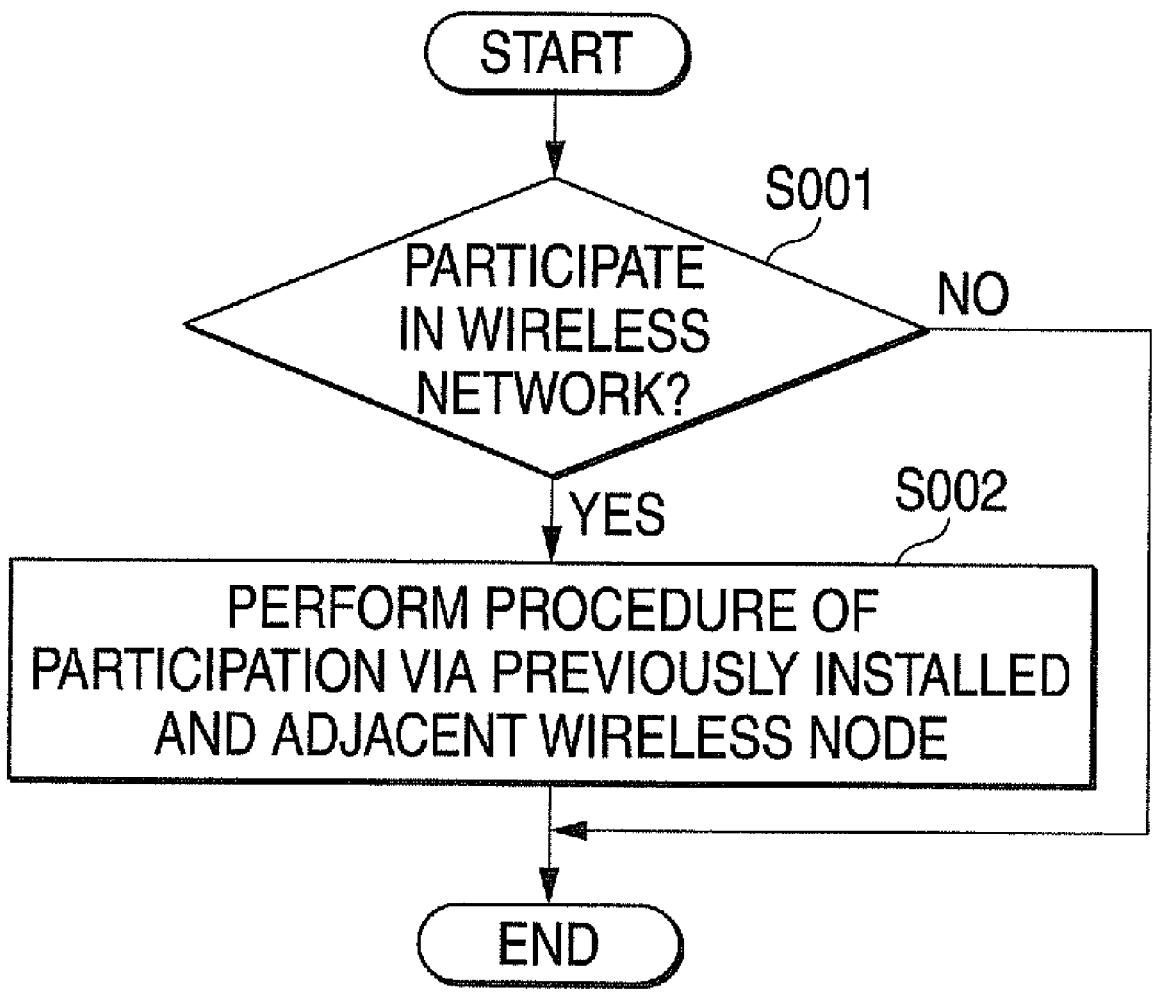
FIG. 14 is a flow diagram for explaining an operation of a newly installed wireless node.
Figure 15:
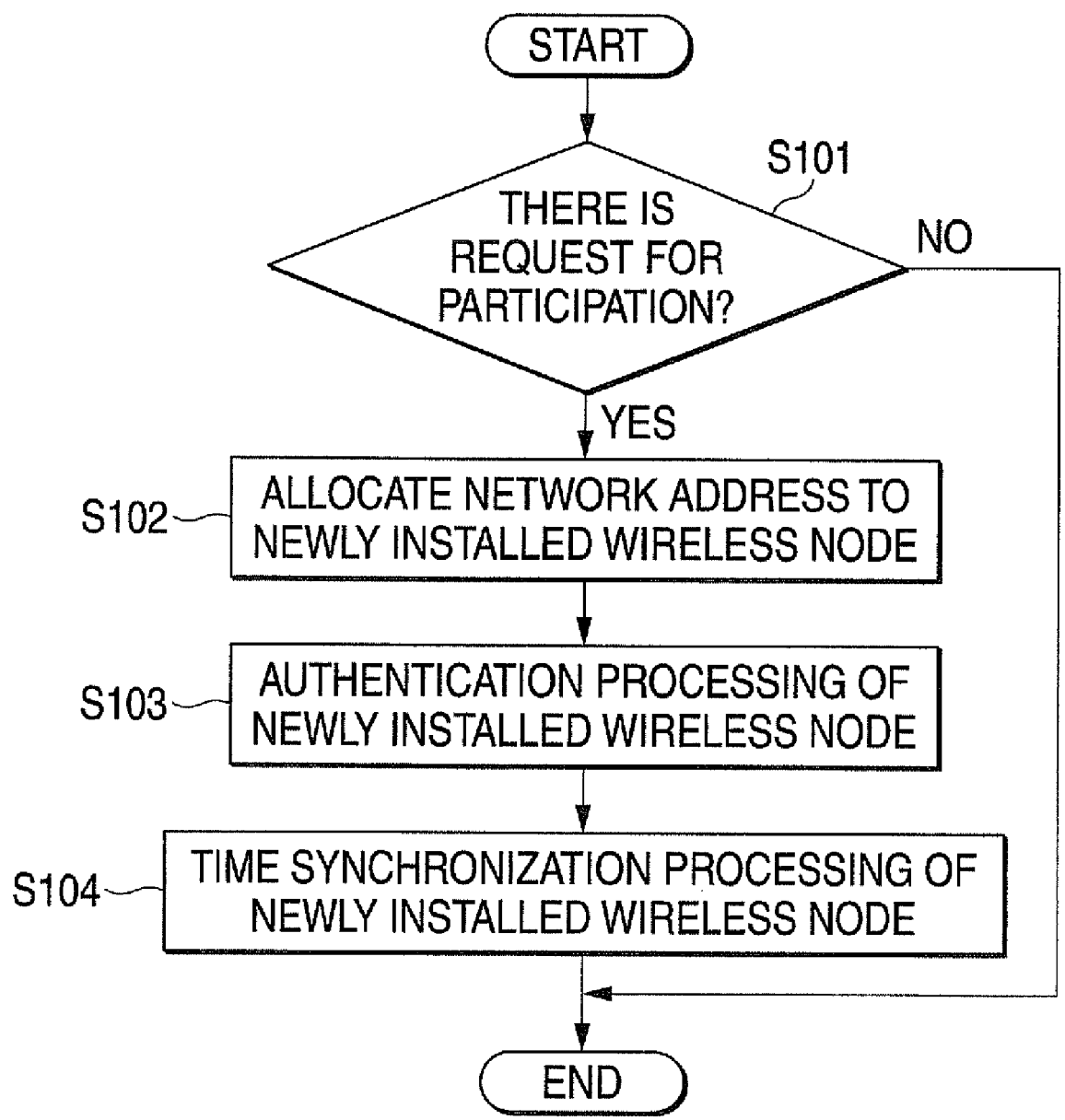
FIG. 15 is a flow diagram for explaining an operation of a previously installed wireless node.
Figure 16:
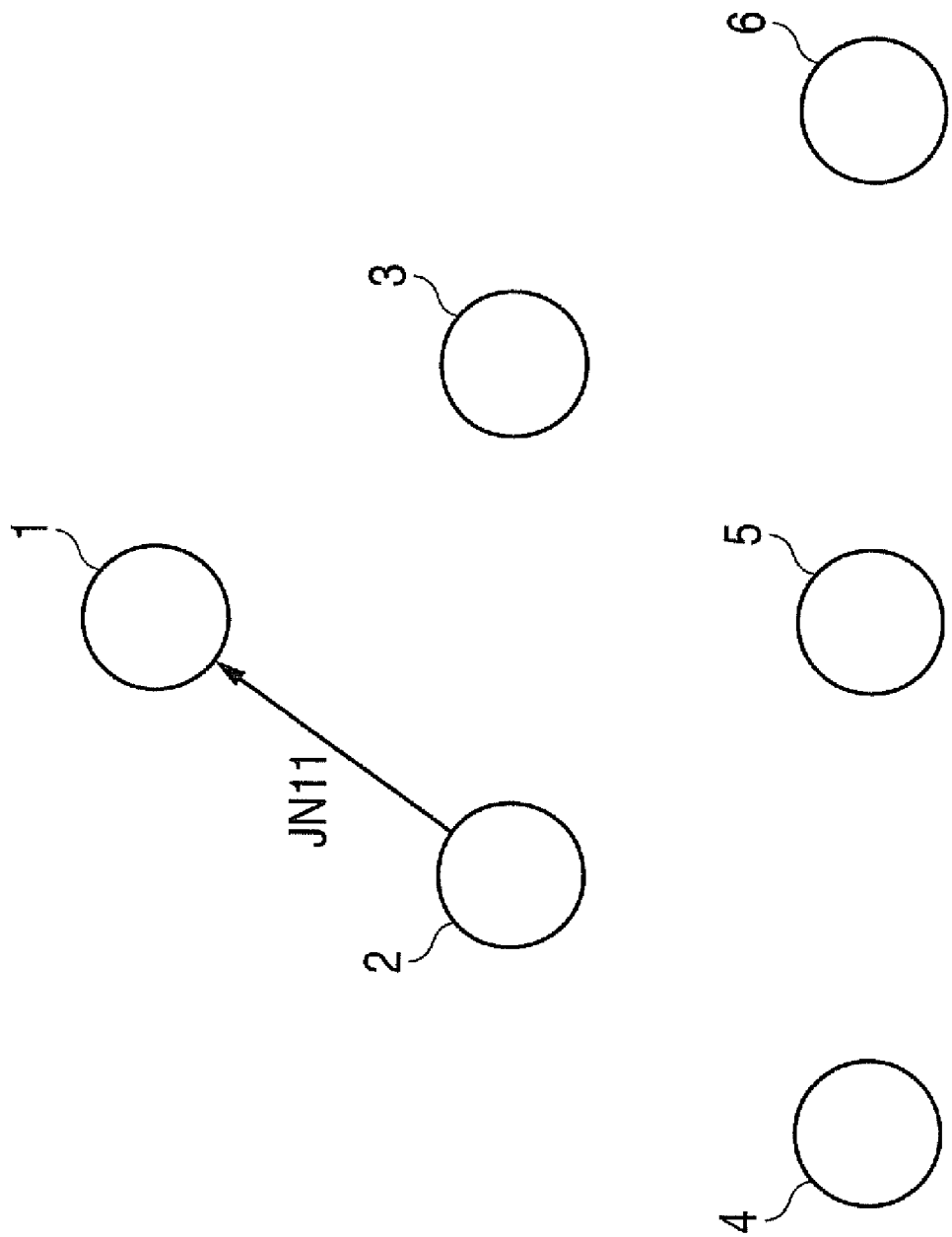
FIG. 16 is an explanatory diagram for explaining a state of wireless network construction.
Figure 17:
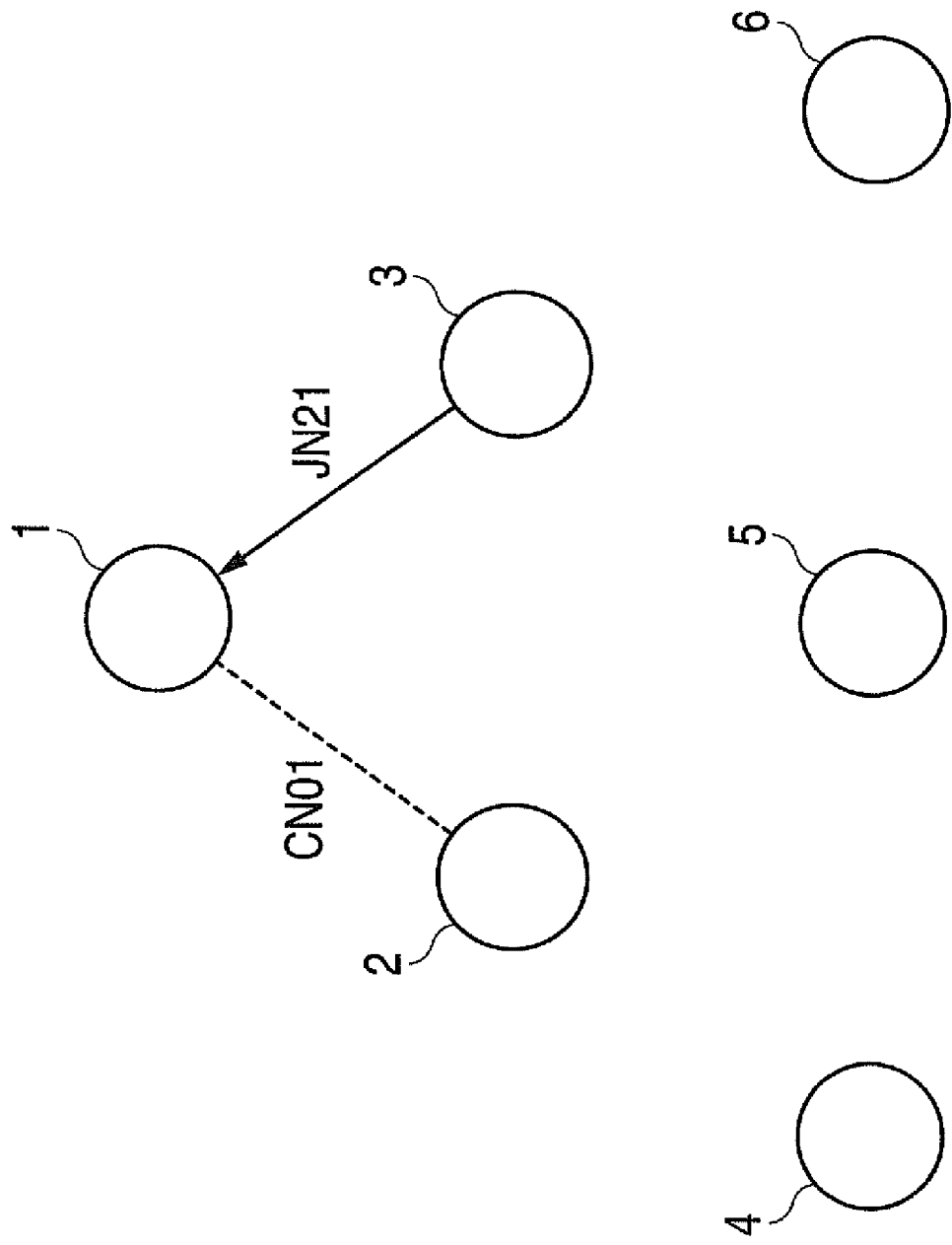
FIG. 17 is an explanatory diagram for explaining a state of the wireless network construction.
Figure 18:
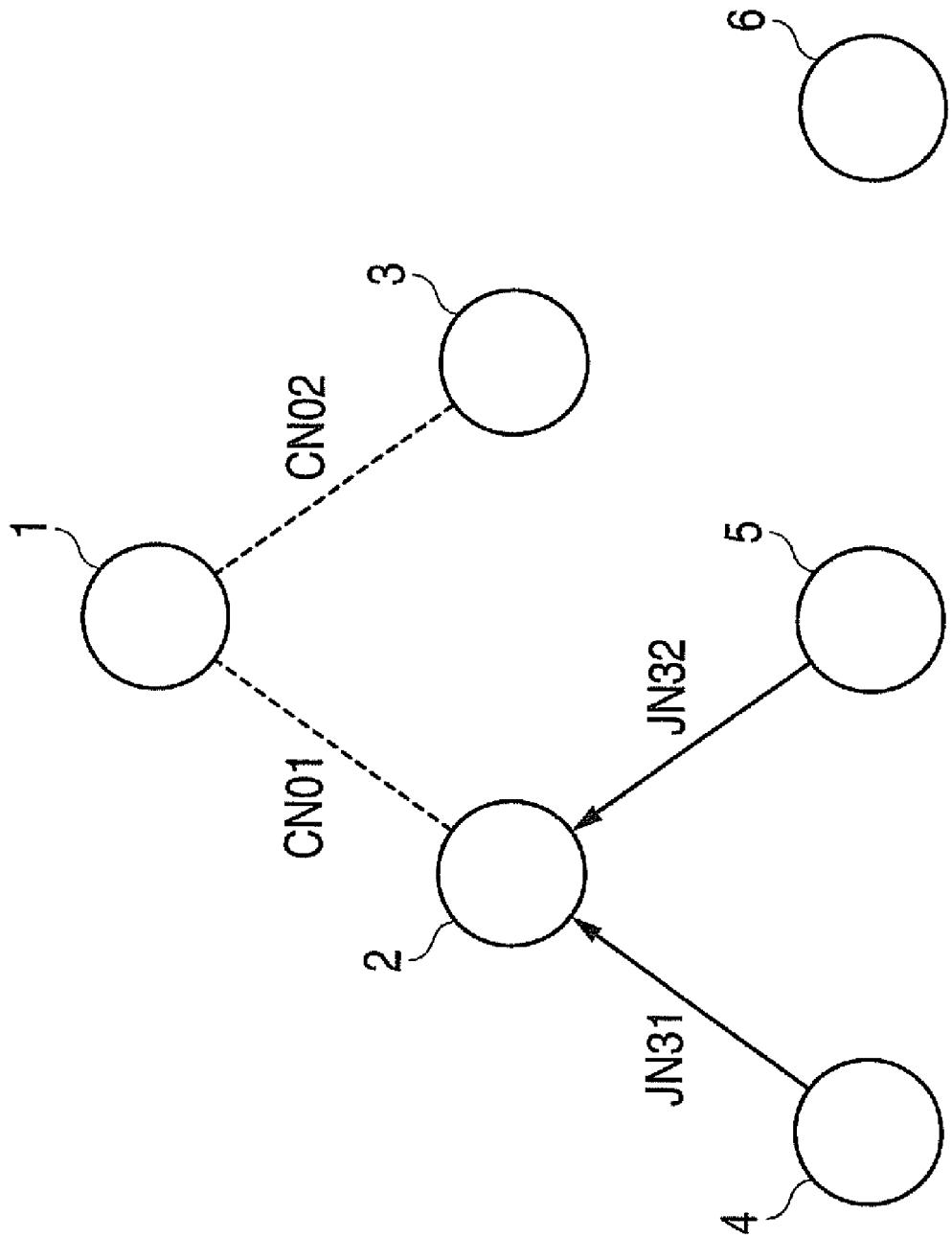
FIG. 18 is an explanatory diagram for explaining a state of the wireless network construction.
Figure 19:
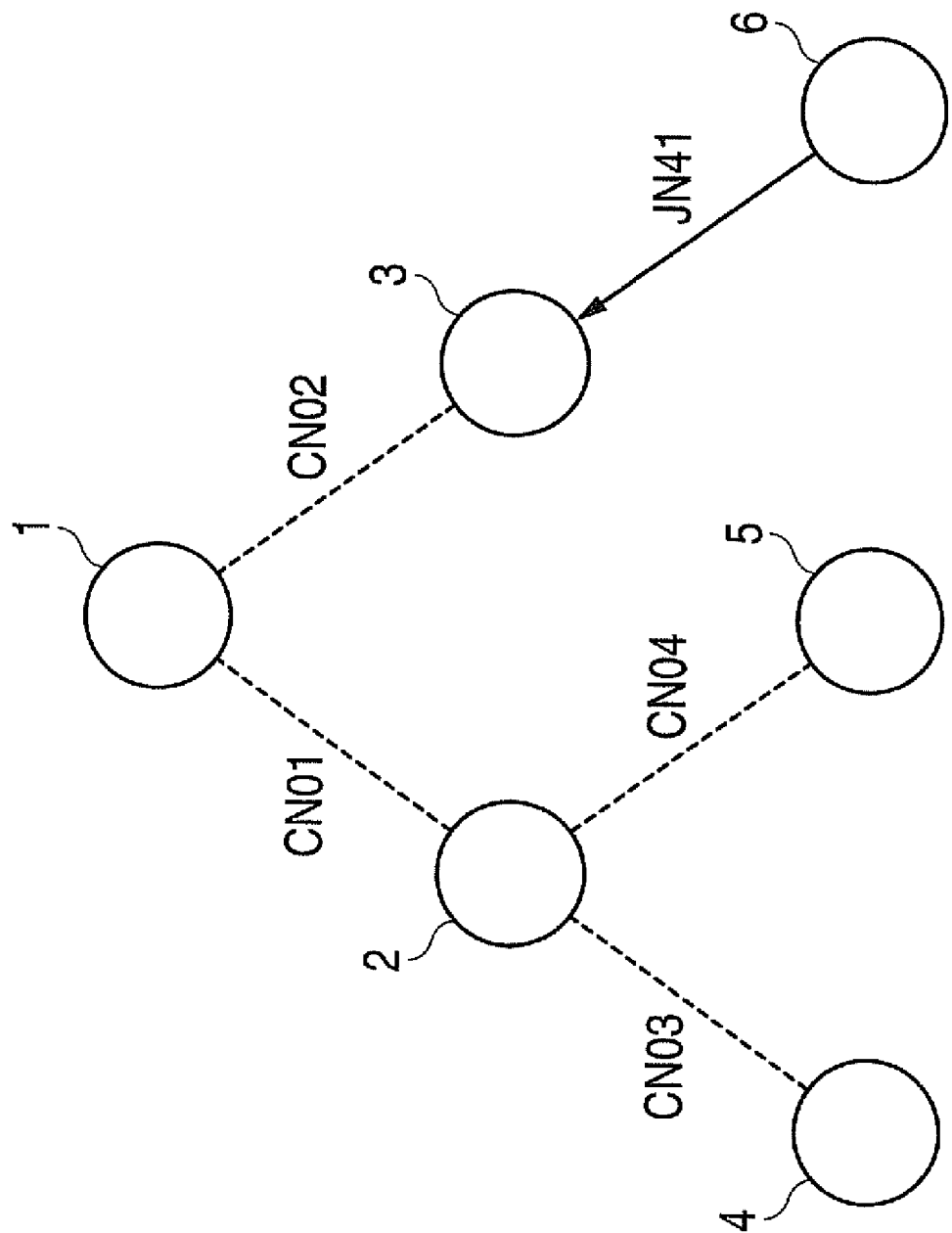
FIG. 19 is an explanatory diagram for explaining a state of the wireless network construction.

An operation of adjusting communication setting of a wireless node by a wireless network construction system using such a wireless node installation support terminal will herein be described using FIGS. 10, 11 and 12. FIG. 10 is a flow diagram for explaining an operation of the wireless node installation support terminal, and FIGS. 11 and 12 are explanatory diagrams for explaining a state of wireless network construction.

An operation as the whole wireless node installation support terminal 50 will hereinafter be described without referring to a configuration of the wireless node installation support terminal 50 for brief description.

In FIGS. 11 and 12, the same numerals as those of FIGS. 1 to 9 are assigned to numerals 11, 12, 13, 14 and 50. Further, a method for newly installing a wireless node and constructing a wireless network is the same as the operation shown in FIGS. 2 to 9, so that the description is omitted properly.

The wireless node installation support terminal 50 is carried by an operator etc. in a location capable of surely conducting wireless communication with a newly installed wireless node, and operates as a previously installed and adjacent wireless node in the conventional example.

Then, in "S1001" in FIG. 10, the wireless node installation support terminal 50 investigates radio wave environment of another wireless node previously participating in a wireless network and the wireless node installation support terminal 50 in an installation place of a newly installed wireless node, and collects information (hereinafter called installation environment information) about environment of the installation place of the wireless node and stores the information in the storage means 9.

For example, when it is assumed that a wireless node 13 is newly installed in a wireless network constructed by wireless nodes 11 and 12 as shown in FIG. 11, the wireless node installation support terminal 50 respectively measures radio wave environment (for example, noise level) of the wireless nodes 11, 12 and the wireless node installation support terminal 50 in an installation place of the wireless node 13 and also, stores the measured installation environment information in the storage means 9.

Also, the wireless node installation support terminal 50 compares the stored installation environment information (for example, noise level) with a predetermined threshold value (for example, a threshold value of a noise level of 30 dB) of installation environment information.

Then, the wireless node installation support terminal 50 determines communication setting information suitable for installation environment so that a newly installed wireless node can properly be communicated with another wireless node by wireless, and also the wireless node installation support terminal 50 stores this communication setting information in the storage means 9.

Concretely, when the stored installation environment information exceeds a threshold value, the wireless node installation support terminal 50 determines communication setting information (for example, a sending output, reception sensitivity or the number of data resendings) suitable for installation environment by increasing (decreasing) a sending output, reception sensitivity or the number of data resendings of a wireless node. Therefore, a newly installed wireless node can properly be communicated with another wireless node by wireless, and stores this communication setting information in the storage means 9.

For example, the wireless node installation support terminal 50 stores the number of data resendings increased so as to improve communication connectivity with a wireless node based on installation environment information in the storage means 9 when the communication connectivity with the wireless node is bad due to an obstacle etc.

Also, description is not particularly made by illustration, but a newly installed wireless node decides whether or not to participate in the existing wireless network, and in the case of deciding to participate in the existing wireless network, the newly installed wireless node performs a procedure of participation in the wireless network via the wireless node installation support terminal 50 using wireless communication.

Next, in "S1002" in FIG. 10, the wireless node installation support terminal decides whether or not there was a request for participation in the wireless network from the newly installed wireless node.

In the case of deciding that there was the request for participation in "S1002" in FIG. 10, the wireless node installation support terminal 50 (corresponding to the previously installed and adjacent wireless node) allocates and distributes a network address to the newly installed wireless node in "S1003" in FIG. 10.

Also, the wireless node installation support terminal 50 (corresponding to the previously installed and adjacent wireless node) performs distribution of a key for encryption or security authentication processing to the newly installed wireless node in "S1004" in FIG. 10, and the wireless node installation support terminal 50 synchronizes time of the newly installed wireless node in "S1005" in FIG. 10.

Then, in "S1006" in FIG. 10, the wireless node installation support terminal 50 (corresponding to the previously installed and adjacent wireless node) sends sending output information for setting a sending output of a wireless node to the newly installed wireless node.

Also, in "S1007" in FIG. 10, the wireless node installation support terminal 50 (corresponding to the previously installed and adjacent wireless node) sends reception sensitivity information for setting reception sensitivity of radio waves of a wireless node to the newly installed wireless node.

Further, in "S1008" in FIG. 10, the wireless node installation support terminal 50 (corresponding to the previously installed and adjacent wireless node) sends information about the number of data resendings for setting the number of resendings of data of a wireless node to the newly installed wireless node.

Then, while description is not particularly made by illustration, the newly installed wireless node respectively changes communication setting based on the communication setting information (for example, sending output information, reception sensitivity information, or information about the number of data resendings) received from the wireless node installation support terminal 50.

Description will hereinafter be made by, for example, assuming that the wireless node 13 is newly installed in a wireless network constructed by the wireless nodes 11 and 12 as shown in FIG. 11.

First, the wireless node installation support terminal 50 investigates radio wave environment of the wireless nodes 11, 12 and the wireless node installation support terminal 50 in an installation place of the wireless node 13.

Also, the wireless node installation support terminal 50 determines communication setting information (for example, a sending output, reception sensitivity or the number of data resendings) suitable for installation environment of the wireless node 13 based on the investigated radio wave environment.

Next, the wireless node 13 performs a procedure of participation in the wireless network via the wireless node installation support terminal 50 (corresponding to the previously installed wireless node adjacent) as shown by "JN71" in FIG. 11.

The wireless node installation support terminal 50 (corresponding to the previously installed and adjacent wireless node) performs processing of time synchronization, key distribution, authentication, distribution, allocation, etc. of a network address to the newly installed wireless node 13.

Then, the wireless node 13 performs a path search and then establishes a wireless line "CN113" in FIG. 11.

Also, the wireless node installation support terminal 50 (corresponding to the previously installed and adjacent wireless node) sends the communication setting information (for example, sending output information, reception sensitivity information, or information about the number of data resendings) suitable for installation environment to the newly installed wireless node 13.

Then, the wireless node 13 changes communication setting based on the communication setting information received from the wireless node installation support terminal 50.

Thus, the wireless node installation support terminal 50 investigates radio wave environment of the wireless nodes 11, 12 and the wireless node installation support terminal 50 in an installation place of the newly installed wireless node 13 and also sends communication setting information suitable for the installation place to the wireless node 13, so that communication setting of the newly installed wireless node 13 is changed.

Further, description will hereinafter be made by assuming that a wireless node 14 is newly installed in a wireless network constructed by wireless nodes 11, 12 and 13 as shown in FIG. 12.

First, a wireless node installation support terminal 50 investigates radio wave environment of the wireless node 12 participating in the wireless network and the wireless node installation support terminal 50 in an installation place of the wireless node 14, and determines communication setting information suitable for installation environment of the wireless node 14.

Next, when the wireless node 14 performs a procedure of participation in the wireless network via the wireless node installation support terminal 50 as shown by "JN81" in FIG. 12, the wireless node installation support terminal 50 performs processing of time synchronization, key distribution, authentication, distribution, allocation, etc. of a network address to the wireless node 14.

Then, the wireless node 14 performs a path search and then establishes a wireless line "CN114" in FIG. 12.

When the wireless node installation support terminal 50 sends the communication setting information suitable for installation environment to the newly installed wireless node 14, the wireless node 14 changes communication setting based on the communication setting information received from the wireless node installation support terminal 50.

Thus, the wireless node installation support terminal 50 investigates radio wave environment of the wireless node 12 and the wireless node installation support terminal 50 in an installation place of the newly installed wireless node 14 and also sends communication setting information suitable for the installation place to the wireless node 14, so that communication setting of the newly installed wireless node 14 is changed.

As a result of this, a wireless node installation support terminal carried by an operator etc. investigates radio wave environment of another wireless node previously participating in a wireless network and the wireless node installation support terminal in an installation place of a newly installed wireless node and also respectively determines communication setting information suitable for the installation place of the wireless node and sends the communication setting information to the wireless node through wireless communication, so that setting work as to the wireless communication of the wireless node can be performed easily.

Also, while an operation of the wireless node installation support terminal of FIG. 10 etc. has been described in connection with the case where the operation control means 8 controls radio wave environment investigation means and investigates radio wave environment of another wireless node participating in a wireless network and the wireless node installation support terminal, exemplary embodiments are not particularly limited to this case, and they may be configured so that the operation control means reads out and executes a program having a function equal to radio wave environment investigation means stored in the storage means 9 and controls wireless communication means and measures radio wave environment of another wireless node participating in a wireless network and the wireless node installation support terminal.

Also, while an operation of the wireless node installation support terminal of FIG. 10 etc. has been described in connection with the case where the wireless node installation support terminal 50 respectively sends communication setting information about a sending output, reception sensitivity, the number of data resendings, etc. to a newly installed wireless node, exemplary embodiments are not particularly limited to this case, and they may be configured so that the wireless node installation support terminal sends communication setting information about a sending output, reception sensitivity or the number of data resendings to a wireless node only when it is necessary to change communication setting of the wireless node.

Also, while an operation of the wireless node installation support terminal of FIG. 10 etc. has been described in connection with the case where the wireless node installation support terminal sends communication setting information to a newly installed wireless node after the newly installed wireless node participates in a wireless network, exemplary embodiments are not particularly limited to this case, and they may be configured so that the wireless node installation support terminal sends communication setting information to a newly installed wireless node when there was a request for sending of communication setting information from a wireless node.

Also, an algorithm for respectively determining communication setting information suitable for an installation place of a wireless node is not limited, and any algorithm may be used.

Additionally, the embodiment shown in FIG. 10 etc. is effectively applied to the following systems etc.
(1) Plant control system
(2) Building automation system (1) In a plant control system, there are many obstacles (facilities etc.) inside a plant structure in which a wireless node is installed, and radio interference also tends to occur. As a result of this, a wireless node installation support terminal investigates radio wave environment of another wireless node participating in advance in a wireless network and the wireless node installation support terminal in an installation place of a newly installed wireless node and also sends communication setting information suitable for the installation place to the newly installed wireless node and the wireless node performs communication setting based on the communication setting information received from the wireless node installation support terminal, so that setting work related to wireless communication of the wireless node can be performed easily.

(2) In a building automation system, when illumination, a switch, etc. are used as a wireless node, there are also many obstacles (equipment, utensils, etc.) inside a building in which the wireless node is installed, and radio interference also tends to occur. As a result of this, a wireless node installation support terminal investigates radio wave environment of another wireless node participating in advance in a wireless network and the wireless node installation support terminal in an installation place of a newly installed wireless node and also sends communication setting information suitable for the installation place to the newly installed wireless node and the wireless node performs communication setting based on the communication setting information received from the wireless node installation support terminal, so that setting work related to wireless communication of the wireless node can be performed easily.

While there has been described in connection with the exemplary embodiments of the present invention, it will be obvious to those skilled in the art that various changes and modification may be made therein without departing from the present invention. It is aimed, therefore, to cover in the appended claim all such changes and modifications as fall within the true spirit and scope of the present invention.

What is claimed is:

1. A wireless network construction system comprising:
   first wireless nodes being previously installed in a wireless network;
   a wireless node installation support terminal which is provided in a location capable of conducting wireless communication with the first wireless nodes and which serves as a wireless node that has been previously installed in the wireless network; and
   a second wireless node that is to be newly installed in the wireless network, wherein
   the second wireless node performs a procedure of participation in the wireless network via the wireless node installation support terminal using wireless communication,
   the wireless node installation support terminal allocates and distributes a network address to the second wireless node at a time of performing the procedure of participation of the second wireless node in the wireless network, and after performing the procedure of participation, the wireless node installation support terminal is removed from the location capable of conducting direct wireless communication with the second wireless node,
   the second wireless node performs a path search and establishes a wireless line between the first wireless nodes and the second wireless node based on the network address distributed by the wireless node installation support terminal, and
   after the wireless line is established, the first wireless nodes and the second wireless node perform wireless communication independent of any further involvement by the wireless node installation support terminal.

2. The wireless network construction system according to claim 1, wherein the wireless node installation support terminal performs distribution of a key for encryption or security authentication processing to the second wireless node.

3. The wireless network construction system according to claim 1, wherein the wireless node installation support terminal synchronizes time of the second wireless node.

4. The wireless network construction system according to claim 1, wherein
the wireless node installation support terminal analyzes a wireless communication state between wireless nodes or a radio wave state of the periphery and then displays analyzed information.

5. The wireless network construction system according to claim 1, wherein the wireless network construction system is applied to a plant control system.

6. The wireless network construction system according to claim 1, wherein the wireless network construction system is applied to a building automation system.

7. The wireless network construction system according to claim 1, wherein the wireless node installation support terminal performs the wireless communication with the second wireless node; stores network address information; allocates and distributes the network address to the second wireless node based on stored network address information upon performing the procedure of participation in the wireless network from the second wireless node.

8. The wireless network construction system according to claim 7, wherein the wireless node installation support terminal further performs distribution of a key for encryption stored in a storage or security authentication processing to the second wireless node.

9. The wireless network construction system according to claim 7, wherein the wireless node installation support terminal synchronizes time of the second wireless node.

10. The wireless network construction system according to 7, wherein the wireless node installation support terminal analyzes a wireless communication state between wireless nodes or a radio wave state of the periphery and displays analyzed information on a display device.

11. The wireless network construction system according to claim 7, wherein the wireless network construction system is applied to a plant control system.

12. The wireless network construction system according to claim 7, wherein the wireless network construction system is applied to a building automation system.

13. The wireless network construction system according to claim 7, wherein the wireless node installation support terminal investigates radio wave environment of the first wireless nodes and the wireless node installation support terminal in an installation location of the second wireless node and then determines communication setting information of the second wireless node, which is stored in a storage and suitable for the installation location.

14. The wireless network construction system according to claim 13, wherein the wireless node installation support terminal sends sending output information to the second wireless node based on the communication setting information.

15. The wireless network construction system according to claim 13, wherein the wireless node installation support terminal sends reception sensitivity information to the second wireless node based on the communication setting information.

16. The wireless network construction system according to claim 13, wherein the wireless node installation support terminal sends information about the number of data resendings to the second wireless node based on the communication setting information.

17. The wireless network construction system according to claim 1, wherein the second wireless node performs a path search in order to establish a wireless connection between the first wireless nodes and the second wireless node.

* * * * *